(12) United States Patent
Umapathy et al.

(10) Patent No.: US 9,094,777 B2
(45) Date of Patent: Jul. 28, 2015

(54) MACHINE-TO-MACHINE ("M2M") PLATFORM SYSTEMS AND METHODS

(71) Applicant: Verizon Patent and Licensing Inc., Arlington, VA (US)

(72) Inventors: Mohanraj Umapathy, San Marcos, CA (US); Phan Anh Tran, Escondido, CA (US); David Geltner, Naperville, IL (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 229 days.

(21) Appl. No.: 13/680,472

(22) Filed: Nov. 19, 2012

(65) Prior Publication Data

US 2014/0143390 A1    May 22, 2014

(51) Int. Cl.
*H04L 12/24*    (2006.01)
*H04W 4/00*    (2009.01)

(52) U.S. Cl.
CPC ........... *H04W 4/005* (2013.01); *H04L 41/0813* (2013.01)

(58) Field of Classification Search
USPC .................................. 370/252, 465; 709/221
See application file for complete search history.

(56) References Cited

U.S. PATENT DOCUMENTS

2014/0075506 A1*    3/2014    Davis et al. ....................... 726/3

FOREIGN PATENT DOCUMENTS

WO    WO 2011/098123 A1 *    8/2011    .............. H04L 12/18

* cited by examiner

*Primary Examiner* — Hoon J Chung

(57) ABSTRACT

Exemplary machine-to-machine ("M2M") systems and methods are disclosed herein. An exemplary method includes an M2M platform system operating an M2M platform in accordance with a functionality set of the M2M platform, receiving data representative of an update to the functionality set of the M2M platform, and seamlessly transitioning, based on the data representative of the update and during runtime operation of the M2M platform, from the operating of the M2M platform in accordance with the functionality set of the M2M platform to operating the M2M platform in accordance with an updated functionality set of the M2M platform. Corresponding systems and methods are also disclosed.

22 Claims, 21 Drawing Sheets

MACHINE-TO-MACHINE ("M2M") PLATFORM SYSTEMS AND METHODS

BACKGROUND INFORMATION

Machine-to-machine ("M2M") technology is a growing industry designed to communicatively connect machines to one another. An M2M solutions provider uses M2M technology to provide an M2M solution to a customer. For example, an M2M solutions provider may provide a client such as a trucking company with an M2M solution that communicatively connects the trucking company's fleet of trucks to a company computing system (e.g., a personal or server computer operated by the trucking company). Company personnel may utilize the company computing system to monitor and/or control the fleet of trucks by way of the M2M solution.

An M2M solutions provider may provide an M2M solution over an M2M platform. Accordingly, the M2M solution may be said to be built on the M2M platform, with the M2M platform providing foundational functionality to support the M2M solution. For example, the M2M platform may provide underlying functionality that establishes communication paths and routes communications between a customer computing system and in-field customer assets as part of an M2M solution.

An M2M solutions provider may provide custom M2M solutions to a variety of customers in diverse industries. The delivery and management of diverse, custom M2M solutions can be challenging for the M2M solutions provider. The extent of the challenges faced by the M2M solutions provider may be dictated in large part by the capabilities of the M2M platform that is used by the M2M solutions provider to provide the M2M solutions. The challenges may be exacerbated if the chosen M2M platform lacks flexibility, usability, and/or scalability. Thus, an M2M solutions provider may prefer an M2M platform that is robust, flexible, usable, and/or scalable and that minimizes the challenges faced by the M2M solutions provider in providing diverse, custom M2M solutions. In particular, there is a need for an M2M platform that is capable of being dynamically and seamlessly updated (e.g., by adding functionality to the M2M platform) in a manner that is transparent to a customer of an M2M solutions provider and/or without interrupting runtime operation of the M2M platform.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF PREFERRED EMBODIMENTS

Exemplary M2M systems, methods, and implementations and elements thereof are disclosed herein. The exemplary systems and methods described herein may provide an M2M technology platform over which one or more M2M solutions may be provided. The M2M platform may provide a secure, reliable, flexible, robust, usable, and/or scalable foundation upon which one or more M2M solutions may be built and provided to one or more customers of an M2M solutions provider. The M2M platform may deliver versatility for custom M2M solutions with "plug and play" speed and/or convenience.

In certain embodiments, for example, an M2M system that provides an M2M platform may be configured to facilitate and/or perform dynamic, seamless updates to the M2M platform during runtime of the M2M platform. The seamless updates may add, modify, and/or remove one or more functions of the M2M platform during runtime operation of the M2M platform in a manner that is transparent to a customer using an M2M solution built on the M2M platform and/or in a manner that does not interrupt the runtime operation of the M2M platform.

Exemplary M2M platforms and seamless updates to M2M platforms are described herein. Examples of M2M systems, methods, and implementations and elements thereof, which may be configured to provide and/or implement any of the M2M platforms and M2M platform operations described herein, will now be described in reference to the accompanying drawings.

Figure 1:
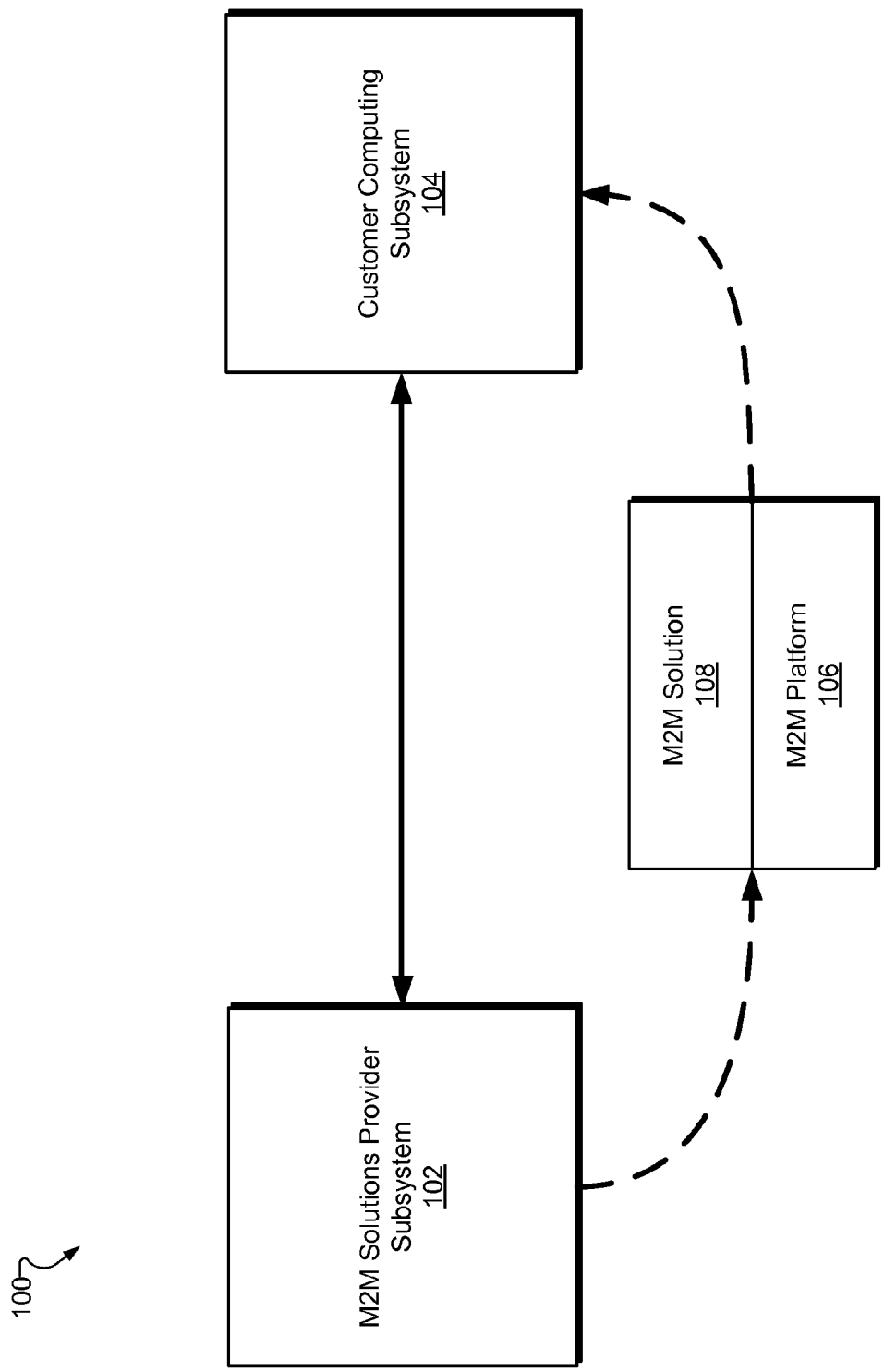
FIG. 1 illustrates an exemplary M2M system according to principles disclosed herein.

FIG. 1 illustrates an exemplary M2M system 100. As shown, system 100 may include an M2M solutions provider subsystem 102 and a customer computing subsystem 104 in communication with one another. As illustrated by the dashed lines in FIG. 1 and as will be described in more detail below, M2M solutions provider subsystem 102 may provide an M2M platform 106 upon which an M2M solution 108 may be built for a customer associated with customer computing system 104. The customer may accordingly utilize M2M solution 108 and underlying M2M platform 106 in order to facilitate M2M communications between various computing devices and/or other customer assets (e.g., in-field customer assets) implementing and/or in communication with customer computing subsystem 104.

M2M solutions provider subsystem 102 may be associated with (e.g., owned by, operated by, and/or managed by) an M2M solutions provider. For example, M2M solutions provider subsystem 102 may be associated with one or more entities involved in providing an M2M solution to a customer. To illustrate, M2M solutions provider subsystem 102 may be associated with a first entity that provides M2M platform 106 and a second entity that provides M2M solution 108, a single entity that provides both M2M platform 106 and M2M solution 108, and/or any other entity or combination of entities involved in providing M2M platform 106 and M2M solution 108 as may serve a particular implementation.

Customer computing subsystem 104 may be associated with (e.g., owned by, operated by, and/or managed by) a customer of the M2M solutions provider. For example, the customer may include an entity (e.g., a business, person, etc.) that has various computing devices, machines, sensors, data centers, and/or other assets that communicate one with another by way of M2M platform 106 and M2M solution 108 provided by M2M solutions provider subsystem 102.

In some examples, M2M solution 108 may comprise an abstraction of one or more high-level, customer-visible services ("customer services") provided by the M2M solutions provider as part of the M2M solution 108. Customer services may include solution-level services provided by M2M solutions provider subsystem 102 as part of M2M solution 108. For example, these customer services may include, without limitation, adding customer assets to M2M solution 108 (by connecting the customer assets to M2M platform 106), monitoring and reporting a status and/or performance of the customer assets, providing means for controlling the customer assets, facilitating customer creation and/or management of applications associated with M2M solution 108, etc.

M2M platform 106 may comprise an abstraction of one or more lower-level services ("platform services") that support and/or perform the customer services of M2M solution 108. Platform services may include platform-level services provided by M2M solutions provider subsystem 102 as part of M2M platform 106 and that may support, underlie, and/or perform one or more customer services of M2M solution 108 provided on top of M2M platform. For example, platform services may include, without limitation, configuring sensors of customer assets, counting data usage of customer assets, translating communications for various telecommunications carriers, etc.

Examples of M2M solution 108, customer services, M2M platform 106, and platform services are described in more detail herein.

M2M solutions provider subsystem 102 and customer computing subsystem 104 may each include and/or be implemented by one or more appropriately configured computing devices, such as one or more server devices located at one or more data centers, one or more client devices configured to communicate with the server devices, customer assets, and/or any other appropriately configured computing devices. The computing devices may be configured to use M2M technology to communicate one with another. As mentioned, M2M solution 108 and/or M2M platform 106 may facilitate M2M communications between various customer assets (e.g., field devices, communication devices, machines, sensors, computing devices, servers, data centers, etc.) that implement and/or are otherwise associated with customer computing subsystem 104.

Figure 2:
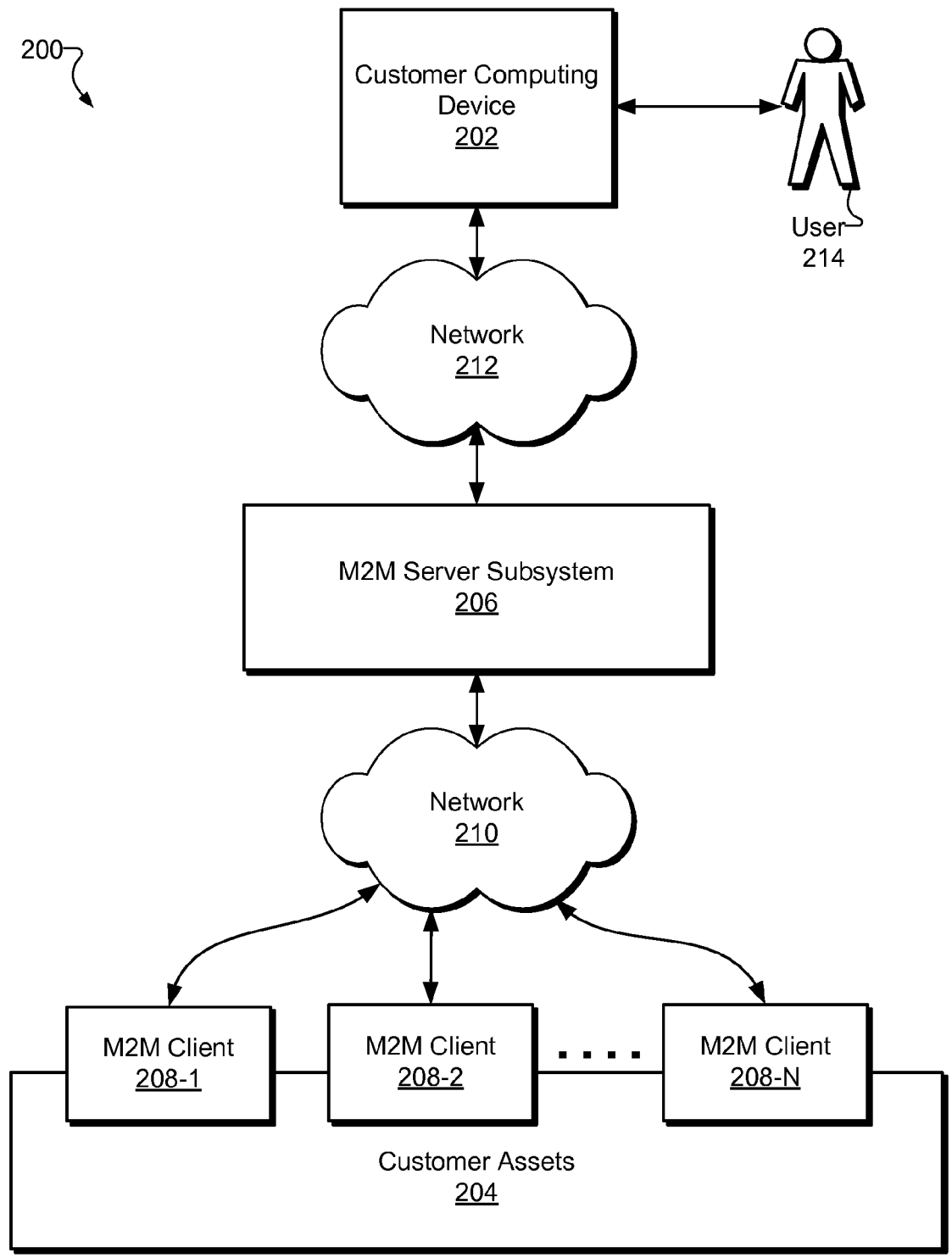
FIG. 2 illustrates an exemplary implementation of the system of FIG. 1 according to principles disclosed herein.

FIG. 2 illustrates an exemplary implementation 200 of M2M system 100. As shown, implementation 200 may include a customer computing device 202, a plurality of customer assets 204, an M2M server subsystem 206, and a plurality of M2M clients 208 (e.g., M2M clients 208-1 through 208-N). In some examples, customer computing device 202 and customer assets 204 may implement customer computing subsystem 104, and M2M server subsystem 206 and M2M clients 208 may implement M2M solutions provider subsystem 102. Each of these components will now be described in more detail.

Customer computing device 202 may include any suitable computing device (e.g., server, personal computer, mobile computing device, etc.) associated with a customer of an M2M solutions provider and configured to communicate with customer assets 204 by way of an M2M solution and platform (e.g., M2M solution 108 and M2M platform 106). Customer computing device 202 may be configured to execute one or more applications configured to interact with the M2M solution. The applications may be developed by the M2M solutions provider, the customer, a system integrator commissioned by the M2M solutions provider and/or the customer, a third party, or any combination thereof.

Customer assets 204 may include any devices, machines, apparatuses, computing devices, sensors, and/or other assets associated with the customer of the M2M solutions provider. In certain examples, customer computing device 202 may include a server located in a data center associated with the customer, and customer assets 204 may include remotely deployed field devices (e.g., parking meters, vending machines, digital billboards, electric meters, etc.). Other configurations and locations of customer computing device 202 and customer assets 204 may be employed in other examples in accordance with the methods and systems described herein as may serve a particular implementation.

M2M server subsystem 206 may be implemented by one or more servers associated with (e.g., managed or otherwise operated by) an M2M solutions provider. The one or more servers may be located in a single data center, distributed across a plurality of data centers (e.g., disparately located data centers), and/or otherwise configured as may serve a particular implementation. M2M server subsystem 206 may be configured to execute or otherwise provide one or more platform services of an M2M platform such as M2M platform 106. Exemplary platform services that may be provided by M2M server subsystem 206 are described in more detail herein.

M2M clients 208 may be configured to provide an M2M communication interface for customer assets 204. M2M clients 208 may provide an M2M communication interface for customer assets 204 in any suitable way. As an example, an M2M client (e.g., M2M client 208-1) may include communication hardware (e.g., a cellular modem) configured to facilitate communication between one or more customer assets 204 and M2M server subsystem 206 by way of a network 210. To illustrate, M2M client 208-1 may be configured to function as a communication gateway or hub for one or more customer assets 204, which may be communicatively coupled to M2M client 208-1 in any suitable manner (e.g., by way of a wired and/or wireless connection).

As another example, one or more of M2M clients 208 may be implemented by a software client that may be loaded or installed onto one or more customer assets 204. For example, an M2M software client may be installed onto a particular customer asset 204 before or after the customer asset 204 has been deployed and may facilitate M2M communications between the customer asset 204 and M2M server subsystem 206.

As another example, an M2M client 208 may be implemented by a stand-alone device configured to be communicatively coupled to a particular customer asset 204. For example, a particular customer asset 204 (e.g., a vending machine) may be retrofitted with an M2M client device (e.g., a sensor device that includes a cellular modem) in order to facilitate M2M communications between the customer asset 204 and M2M server subsystem 206. Additionally or alternatively, an M2M client 208 may be integrated into a particular customer asset 204 at the time of manufacture.

As another example, an M2M client 208 may be implemented by one or more sensors configured to monitor an operation of one or more customer assets 204. For example, an M2M client 208 may capture or detect one or more events that occur with respect to a particular customer asset 204. As used herein, an "event" that may occur with respect to a customer asset may include a change in one or more properties and/or characteristics of the customer asset. Examples of such an event may include, but are not limited to, a change in data usage by the customer asset, a change in an inventory level of the customer asset, and/or a change in power usage by the customer asset.

As mentioned, M2M clients 208 may communicate with M2M server subsystem 206 by way of network 210. Likewise, M2M server subsystem 206 may be configured to communicate with customer computing device 202 by way of network 212. Networks 210 and 212 may each include one or more wireless networks, cellular networks (e.g., 3G, 4G, or long term evolution ("LTE") networks), carrier-specific networks, broadband networks, closed media networks, cable networks, satellite networks, the Internet, intranets, wide area networks, local area networks, public networks, private networks, optical fiber networks, and/or any other networks or combination of networks capable of carrying data and communications signals between customer computing device 202 and M2M server subsystem 206 and/or between M2M server subsystem 206 and M2M clients 208. While networks 210 and 212 are shown to be separate networks in FIG. 2 (e.g., network 210 may include one or more telecommunication carrier networks and network 212 may include the Internet), it will be recognized that, in some examples, networks 210 and 212 may alternatively be a single network.

Customer computing device 202, M2M server subsystem 206, and M2M clients 208 may communicate using any communication technologies suitable for transporting data, including known communication devices, media, and protocols supportive of remote or local data communications. Examples of such communication technologies include, but are not limited to, data transmission media, communications devices (e.g., network devices such as routers, switches, etc.), Transmission Control Protocol ("TCP"), Internet Protocol ("IP"), Hypertext Transfer Protocol ("HTTP"), Hypertext Transfer Protocol Secure ("HTTPS"), Session Initiation Protocol ("SIP"), Ethernet, and any other suitable communications technologies, devices, media, and protocols, including any of those disclosed herein.

In certain implementations, M2M communications, such as M2M communications between customer computing device 202, M2M server subsystem 206, and M2M clients 208 may use command and acknowledgement processing. For example, for each M2M message received, an acknowledgement message is returned. If a predefined acknowledgement time limit expires before an acknowledgement message is received by a sender of an M2M message, the sender resends the M2M message or stores and resends the M2M message at a future time. In certain implementations, acknowledgement messages may contain return codes, which may be used to verify the validity of the messages. The use of command and acknowledgement processing for M2M messaging may produce a communications infrastructure that is suitable for a reliable M2M platform and M2M solutions built on the M2M platform.

In some examples, one or more users may be associated with customer computing device 202 and/or M2M server subsystem 206. For example, as shown in FIG. 2, a user 214 may be associated with customer computing device 202. User 214 may be a customer, a system administrator, an M2M solution integrator (e.g., a person commissioned by the customer and/or the M2M solutions provider to work with the customer to set up and/or manage an M2M solution), and/or any other person associated with customer computing device 202.

User 214 may utilize customer computing device 202 to communicate with and/or control one or more customer assets 204 by way of an M2M solution. To this end, user 214 may utilize customer computing device 202 to configure, create, modify, or otherwise access one or more rules, features, and/or other custom settings associated with an M2M solution (e.g., M2M solution 108) provided or otherwise managed by M2M server subsystem 206. For example, user 214 may utilize customer computing device 202 to access one or more management portals provided by M2M server subsystem 206 by way of which the user 214 may configure, create, modify, or otherwise access one or more rules, features, and/or other custom settings associated with the M2M solution provided by M2M server subsystem 206.

M2M server subsystem 206 may be configured to provide an M2M platform, such as M2M platform 106, and/or functionality of an M2M platform. As described herein, the M2M platform may provide communication paths and/or facilitate communications between customer computing device 202 and M2M clients 208 as part of an M2M solution. The M2M platform may include and/or provide additional functionality that supports the M2M solution (and one or more other M2M solutions built on the M2M platform). As mentioned, such platform functionality may be provided by platform services of the M2M platform.

Figure 3:
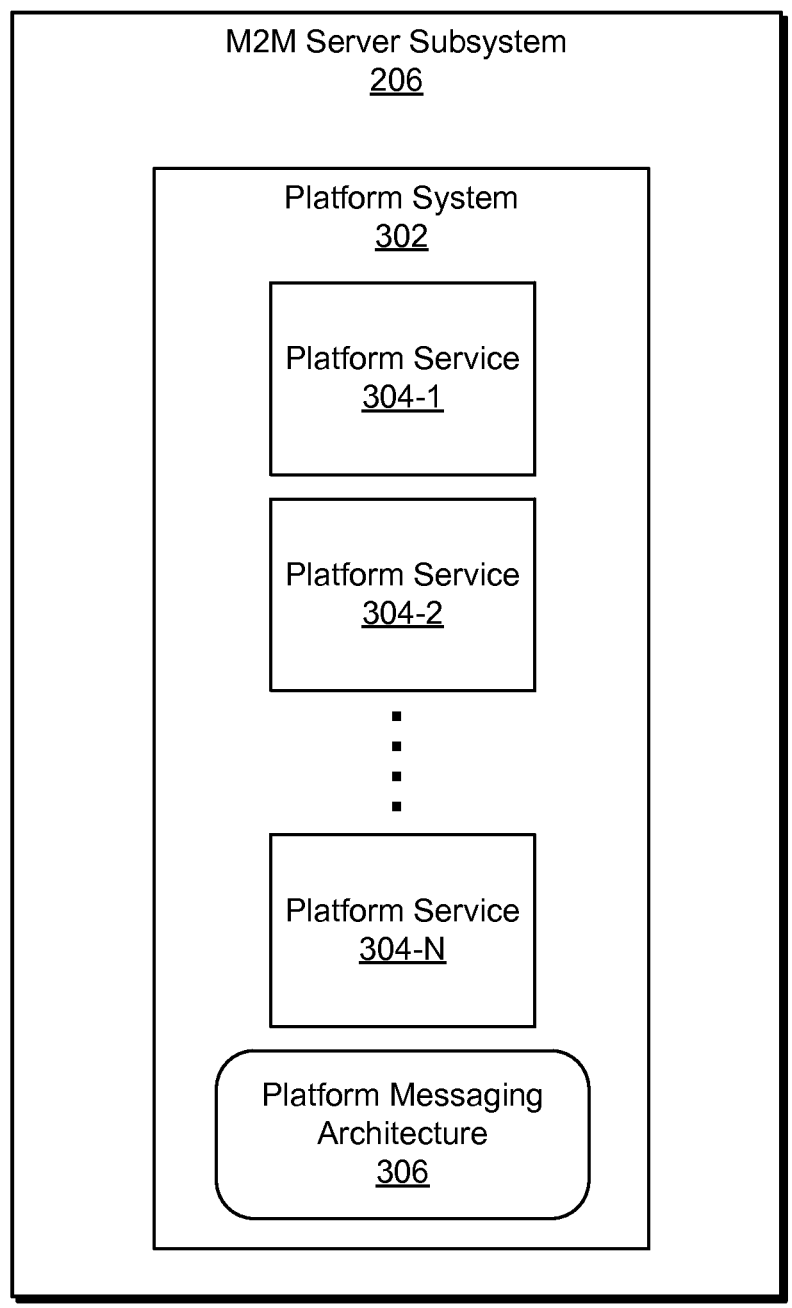
FIG. 3 illustrates exemplary components of an M2M server subsystem according to principles disclosed herein.

To illustrate, FIG. 3 shows exemplary components of M2M server subsystem 206. As shown, M2M server subsystem 206 may include a platform system 302 that comprises a set of platform services 304 (e.g., platform services 304-1 through 304-N) and a platform messaging architecture 306.

Platform services 304 may be configured to provide functionality of an M2M platform provided by platform system 302. In certain examples, each platform service within the set of platform services 304 may be configured to provide a particular set of M2M platform functions. Platform services 304 may be implemented in any suitable way. For example, a platform service 304 may be implemented as an application (e.g., a software, firmware, and/or middleware application), such as a web application, Linux application, and/or any other suitable application running on one or more server devices at one or more data centers operated by an M2M platform provider. Examples of platform services 304 will now be described.

The set of platform services 304 may include one or more platform services configured to provide functionality for external communications. For example, platform services 304 may include one or more M2M client gateway services configured to provide functionality for communications between M2M server subsystem 206 and M2M clients 208. Examples of such services may include, without limitation, a Dynamic Secure Network ("DSN") gateway service, a Simple Network Management Protocol ("SNMP") gateway service, a Multifunction Telecommunications Addressing System ("MTAS") gateway service, a Really Simple Syndication ("RSS") gateway service, a Short Message Service ("SMS") gateway service, and a carrier-specific Global Data Service Platform ("GDSP") gateway service.

In certain examples, the set of platform services 304 may include specific M2M client gateway services for respective communications technologies and/or carriers. For example, the set of platform services 304 may include a gateway service for a first telecommunications carrier and another gateway service for a second telecommunications carrier. Additionally or alternatively, the set of platform services 304 may include a gateway service for a first communications technology (e.g., DSN communications) and another gateway service for a second communications technology (e.g., SNMP communications). While specific communications technologies that may be supported by the set of platform services 304 for communications with M2M clients 208 are disclosed herein, the examples are illustrative only. The set of platform services 304 may be configured to support any communications technologies that may be used for communications with M2M clients 208.

Platform services 304 may additionally or alternatively include one or more customer interface services configured to provide functionality for communications between M2M server subsystem 206 and customer computing device 202. For example, platform services 304 may include one or more customer interface platform services configured to provide functionality for communications between M2M server subsystem 206 and customer computing device 202. Examples of such services may include, without limitation, a web services platform service (e.g., Unified Web Services ("UWS") service), a customer portal platform service, a rules engine platform service, and a notification platform service.

A web services platform service may be configured to interface with and/or facilitate functionality on customer computing device 202, such as by facilitating the execution of an application on customer computing device 202, such that the application running on customer computing device 202 may connect and interact with the web services platform service by way of network 212. The web services platform service may further facilitate integration of one or more customer services associated with an M2M solution within customer computing device 202.

The customer portal platform service may be configured to provide functionality to interface with customer computing device 202, such as with a web browser application running on customer computing device 202, by way of network 212. For example, customer portal platform may provide data for use by customer computing device 202 to render a graphical user interface of a web portal such that a user of customer computing device 202 may interact with web portal by way of the graphical user interface.

The rules engine platform service may be configured to manage (e.g., maintain and/or execute) one or more rules that specify how events detected by M2M clients 208 are to be processed by other platform services included in platform system 302.

The notification platform service may be configured to provide functionality to provide notifications (e.g., a notification that data usage by a customer asset has reached a predetermined data usage threshold) to user 214 by way of customer computing device 202 (or to any other user by any other computing device) by way of network 212.

The customer interface platform services, such as those described above, may provide customer facing interfaces through which a customer may interact with an M2M solution provided by system 100.

In certain examples, platform services 304 may include a common carrier platform service configured to provide functionality that creates a level of abstraction between technology-specific and/or carrier-specific platform services and one or more other platform services (e.g., customer interface services) included in the set of platform services 304. To this end, the common carrier platform service may be configured to provide functionality for translating messages to and/or from formats that are suitable for technology-specific and/or carrier-specific platform services. To illustrate, a web services platform service within platform system 302 may receive a control message provided by customer computing device 202 in a web services message format (e.g., Simple Object Access Protocol ("SOAP"), Extensible Markup Language ("XML"), or Web Service Description Language ("WSDL")) to M2M server subsystem 206 by way of network 212 and route the control message to a common carrier platform service within platform system 302. The common carrier platform service may translate the control message from the web services message format to another format that is specific to a carrier gateway platform service configured to transmit the control message to an appropriate M2M client 208. The common carrier platform service may then route the translated control message to the carrier gateway platform service, which may process and transmit the control message to the M2M client 208 by way of network 210.

The level of abstraction provided by the common carrier platform service may help produce an environment friendly to customers and/or developers by simplifying the development of custom M2M solutions. For example, a customer-facing interface may employ a single communications interface that allows applications to be developed to interact with the single communications interface. The common carrier platform service may perform translations that allow various carriers and/or technologies to be used within M2M system 100, without requiring a customer to account for or even be aware of which carriers and/or technologies are being used to provide an M2M solution to the customer. In certain examples, specific technologies and/or carriers used by M2M system 100, and particularly by platform system 302, may be transparent to the customer.

In certain examples, the level of abstraction provided by the common carrier platform service may allow a user (e.g., a customer of an M2M solutions provider) to conveniently provision (i.e., activate) and de-provision (i.e., deactivate) devices on a carrier network. The common carrier platform service may hide specifics (e.g., complexities) of a carrier network and processes, which may simplify the provisioning and de-provisioning operations for the user.

Figure 4:
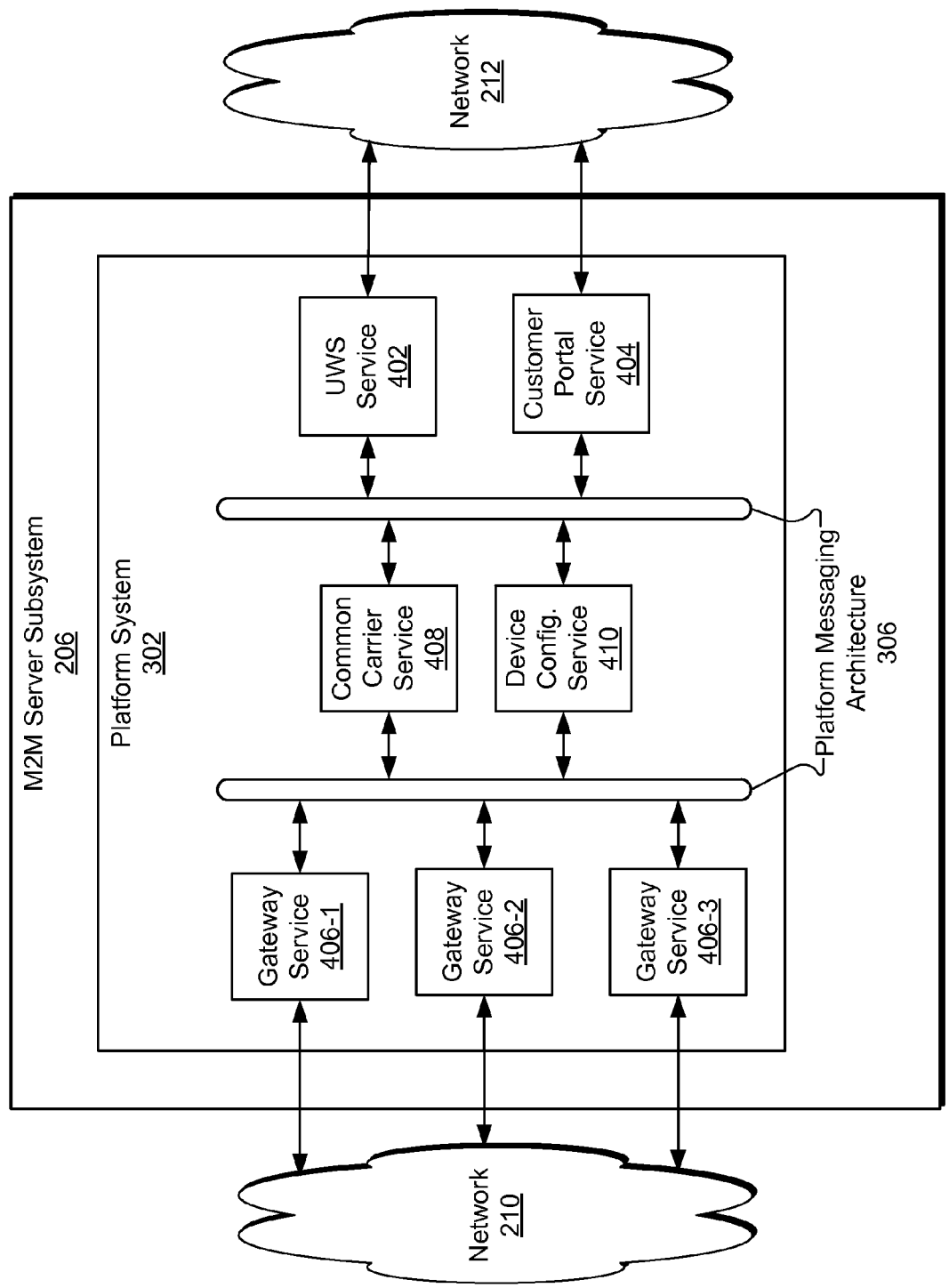
FIG. 4 illustrates exemplary platform services that may be included in a platform system according to principles disclosed herein.

FIG. 4 illustrates exemplary platform services that may be included in platform system 302. As shown, platform system 302 may include a UWS service 402 and a customer portal service 404 communicatively coupled to network 212. UWS service 402 and customer portal service 404 may be configured to communicate with customer computing device 202 by way of network 212.

Platform system 302 may further include gateway services 406 (e.g., gateway services 406-1 through 406-3) communicatively coupled to network 210. Gateway services 406 may be configured to communicate with M2M clients 208 by way of network 210. In certain examples, each of the gateway services 406 may be specific to a particular telecommunications carrier and/or communications technology (e.g., SNMP, RSS, MTAS, SMS, or other suitable network transport and/or protocol technology).

Platform system 302 may further include a common carrier service 408 configured to translate data (e.g., communication messages) between different formats, protocols, etc. and/or to provide a level of abstraction between gateway services 406 and one or more other platform services included in platform system 302.

Platform system 302 may further include a device configuration service 410 configured to communicate with M2M clients 208 by way of gateway services 406 and network 210 to facilitate configuration of the M2M clients 208 to communicate with platform system 302 using particular data communication technologies included in the data communication technologies supported by platform system 302. To illustrate, platform system 302 may support various data communication technologies that may be used for communications with M2M clients 208, such as various data communication transports, protocols, and/or services (e.g., SMS, wireless, wireline, TCP, UDP, etc.). Device configuration service 410 may communicate with an M2M client 208 to facilitate configuration of the M2M client 208 to use a particular data communication transport, protocol, and/or service to communicated with platform system 302. For instance, device configuration service 410 may communicate with the M2M client 208 to facilitate configuration of the M2M client 208 to use SMS to communicate with platform system 302.

In certain examples, the exemplary platform services and the interconnections thereof (e.g., by way of platform messaging architecture 306) illustrated in FIG. 4 may represent one or more pathways along which data (e.g., M2M application data, sensor data, etc.) may flow between customer computing device 202 and M2M clients 208 within an M2M platform provided by platform system 302. For example, customer computing device 202 may send a message to UWS service 402 by way of network 212. UWS service 402 may process the message such as by receiving and routing the message to common carrier service 408. Common carrier service 408 may receive and process the message such as by translating the message from a web services message format to a gateway-specific format and routing the translated message to a gateway service 406. The gateway service 406 may then receive and process the message such as by transmitting the message to an M2M client 208 by way of network 210. As another example, an M2M client 208 may send a message to a gateway service 406, which may receive and route the message to common carrier service 408. Common carrier service 408 may receive, translate (e.g., from a gateway-specific format to a web services message format), and route the message to UWS service 402. UWS service 402 may then receive and process the message such as by transmitting the message to customer computing device 202 by way of network 212.

The exemplary platform services described above, such as the platform services illustrated in FIG. 4, are illustrative only. Additional or alternative platform services may be included in platform system 302. For example, referring again to FIG. 3, the set of platform services 304 may include, without limitation, a discovery platform service that may be configured to discover and/or to maintain and provide configuration data (e.g., configuration software) to an M2M client 208, a sensor configuration platform service that may be configured to maintain and provide sensor configuration data to an M2M client 208, a sensor data delivery platform service that may be configured to receive data (e.g., readings, events, errors, etc.) from an M2M client 208, a device control platform service that may be configured to receive control input from customer computing device 202 (e.g., directly or by way of one or more other platform services 304 such as customer portal service 404) and to provide device control commands to an M2M client 208 (e.g., directly or by way of one or more other platform services 304 such as a gateway service 406), an SMS platform service that may be configured to abstract an SMS interface to various telecommunications carriers such that the SMS interface may be used for SMS communications without having to deal with specifics of multiple carrier networks, an application server platform service for enterprise applications (e.g., for Java enterprise applications), a terminal wakeup platform service that may be configured to "awake" a field device (e.g., to call in and report) such as by connecting to the device using a TCP/IP connection or sending an SMS communication to the device (e.g., by way of the SMS platform service), an authentication and accounting platform service that may be configured to authenticate a field device to a carrier network, and a device performance platform service that may be configured to perform one or more operations associated with determining (e.g., monitoring) measures of device performance. Examples of other platform services are also described below.

Platform services 304 included in platform system 302 may be disparate and loosely coupled to one another in certain implementations. For example, platform services 304 may be implemented in a service-oriented architecture. In such implementations, each platform service 304 may be configured to provide a discrete set of functions of an M2M platform. Such a loosely coupled compartmentalization of platform functionality may be well suited for addressing challenges related to scale, availability, customizability, and performance of an M2M platform.

Platform services 304 may be configured to communicate with one another via well-defined interfaces (e.g., XML, JSON, etc.). For certain inter-service communications, the platform services 304 may communicate with one another by way of platform messaging architecture 306.

Platform messaging architecture 306 may comprise a message delivery architecture and/or layer configured to process messages within an M2M platform provided by platform system 302. For example, platform messaging architecture 306 may be configured to receive and deliver messages from/to platform services 304 to facilitate communications between the platform services 304.

Figure 5:
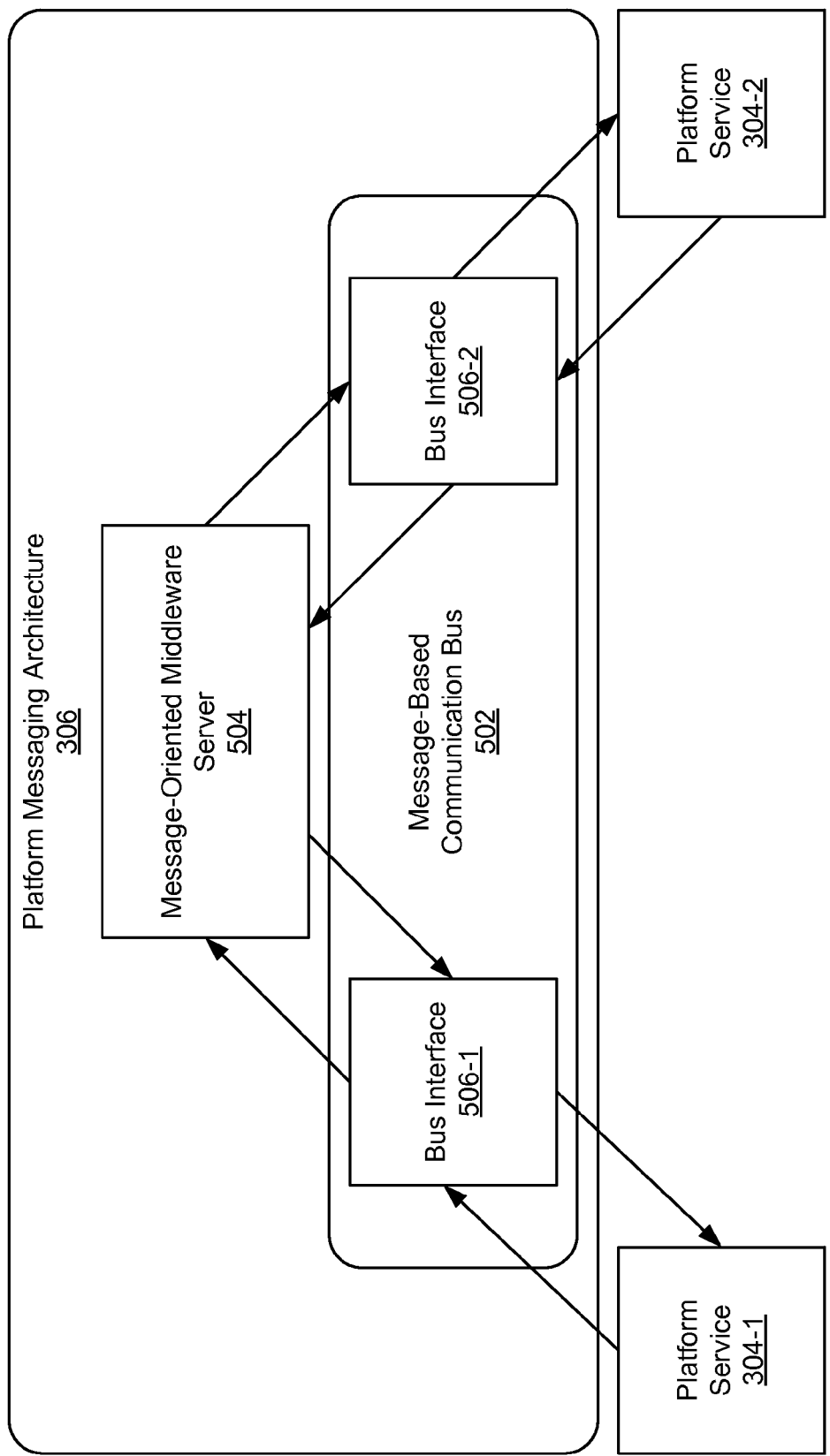
FIG. 5 illustrates an exemplary flow of communications between platform services by way of a platform messaging architecture according to principles disclosed herein.

Platform messaging architecture 306 may comprise any message delivery architecture suitable for an M2M platform. To illustrate, FIG. 5 shows components of an exemplary implementation of platform messaging architecture 306 and a flow of communications between platform services by way of platform messaging architecture 306. As shown, platform messaging architecture 306 may include a message-based communication bus 502 and a message-oriented middleware server 504, which may be in communication one with another.

Message-oriented middleware server 504 may include any message delivery infrastructure that supports sending and receiving of messages by way of a distributed communications layer. In certain implementations, message-oriented middleware server 504 may comprise a Java Message Service ("JMS") server which may be configured to communicate with message-based communications bus 502 via a low-level input/output application program interface ("API"), such as a JMS API. In some examples, the JMS server may comprise a commercial off-the-shelf product.

Message-oriented middleware server 504 may be configured to use a universal message protocol for transport and delivery of messages. In certain implementations, for example, message-oriented middleware server 504 may use SOAP messages on top of a JMS protocol for transport and delivery of messages.

Message-oriented middleware server 504 may be configured to maintain one or more messaging queues and to read, write, or otherwise facilitate the communication of messages to/from such messaging queues or other messaging queues. For example, a queue within message-oriented middleware server 504 may be allocated to or otherwise associated with each platform service included in a set of platform services 304. The queues may be labeled with identifiers for (e.g., names of) the associated platform services 304. Message-oriented middleware server 504 may be configured to read ("dequeue") messages from the queues and/or to write ("enqueue") messages to the queues. Message-oriented middleware server 504 may be further configured to route messages to queues. The routing may include routing a message across one or more data centers to an appropriate queue assigned to a specific platform service. To illustrate, message-oriented middleware server 504 may read a message from a queue associated with a first platform service and determine, from the message, a destination platform service and/or queue to which the message is to be routed. Message-oriented middleware server 504 may route and write the message to the queue associated with the destination platform message.

Message-based communications bus 502 may provide an interface between message-oriented middleware server 504 and one or more platform services 304 that are connected to message-based communications bus 502. Message-based communications bus 502 may be in communication with message-oriented middleware server 504 by way of one or more APIs (e.g., a standard JMS API) exposed by message-oriented middleware server 504. Through such APIs, message-based communications bus 502 may provide messages to and retrieve messages from message-oriented middleware server 504. For example, message-based communications bus 502 may be configured to provide a message (e.g., a SOAP message) to message-oriented middleware server 504 for routing and delivery to a destination and/or to retrieve a message from message-oriented middleware server 504 by way of an API exposed by message-oriented middleware server 504.

Message-based communications bus 502 may be in communication with platform services 304 in any suitable way. For example, a platform service may be connected to message-based communications bus 502 at a bus interface. In FIG. 5, for instance, platform service 304-1 is connected to message-based communications bus 502 at a bus interface 506-1 included in the message-based communications bus 502, and platform service 304-2 is connected to message-based communications bus 502 at another bus interface 506-2 included in the message-based communications bus 502.

A platform service may connect to a bus interface 506 of message-based communications bus 502 in any suitable way. In certain implementations, for example, a bus interface 506 may be configured to allow a platform service to connect to message-based communications bus 502 by way of a low-level communication layer (e.g., a transport-level layer of message-based communications bus 502). Such a connection may allow the platform service to utilize functionality of message-based communications bus 502 directly by way of detailed, transport-level function calls and/or other low-level communications. Such low-level communications may provide the platform service with flexibility in utilizing certain capabilities built into message-based communications bus 502. Such flexibility may be unavailable (e.g., abstracted away) through a higher level connection to message-based communications bus 502.

Additionally or alternatively, in certain implementations, a bus interface 506 may be configured to allow a platform service to connect to message-based communications bus 502 by way of a higher, abstraction-level communication layer that abstracts away detail of the low-level communications layer. To this end, the bus interface 506 may provide a higher-level interface layer with which a platform service may connect. The higher-level interface layer may be configured to translate higher-level communications into low-level function calls of the low-level communications layer and vice versa. Such an interface between a platform service and message-based communications bus 502 may provide less flexibility in comparison to the flexibility provided by a direct connection between a platform service and message-based communications bus 502 at a low-level transport layer but may provide convenience to a developer of the platform service because the platform service can communicate by way of the abstraction-level interface. platform messaging architecture 306 platform messaging architecture 306

In certain implementations, a bus interface 506 may comprise a message-based communication bus layer within a platform service. For example, bus interface 506-1 may comprise a message-based communication bus layer implemented within platform service 304-1. A platform service connected to a bus interface 506 of the message-based communications bus 502 may function as a destination point (e.g., a figurative "bus stop") along message-based communications bus 502.

A bus interface (e.g., bus interface 506-1 or 506-2) included in message-based communications bus 502 may be configured to translate messages between a messaging format and/or protocol specific to a platform service (e.g., platform service 304-1 or 304-2) connected to the bus interface and a universal messaging format and/or protocol used by message-oriented middleware server 504. This may provide a level of abstraction between platform services 304 and message-oriented middleware server 504. Accordingly, platform services may use heterogeneous messaging formats and/or protocols to communicate with one another by way of platform messaging architecture 306. The abstraction may prove helpful to a developer (e.g., an M2M platform provider) of platform services, as the abstraction may allow the developer to focus on the functionality of the platform services under development rather than the communication challenges the platform services will face when deployed.

To illustrate, platform service 304-1, which may be implemented with a Java programming language, may make a call to invoke platform service 304-2. In some examples, platform service 304-1 may not have access to information about platform service 304-2 beyond the name of the platform service 304-2. For example, platform service 304-1 (and each other platform service 304) may include and maintain a directory of platform services included in the set of platform services 304. In some examples, the directory may specify the platform services by name only.

In the present example, platform service 304-2 may use the name of platform service 304-2 (as specified in the directory of platform services) to issue a call to invoke platform service 304-2. Bus interface 506-1 may detect the call, determine that the call is directed to another platform service 304-2, translate the call from a Java message to a universal messaging protocol used by message-oriented middleware server 504 (e.g., a SOAP message), and provide a universal messaging protocol message to message-oriented middleware server 504 for delivery to platform service 304-2. Message-oriented middleware server 504 may route the message to a queue associated with platform service 304-2 and write the message to the queue. Bus interface 506-2 associated with platform service 304-2 may read the message from the queue, translate the message to a format and/or protocol specific to platform service 304-2 (e.g., to a C# format if platform service 304-2 is implemented with a C# programming language), and provide the translated message for processing by platform service 304-2.

In this or a similar manner, platform messaging architecture 306 may provide communication paths and flows between platform services 304 such that the platform services 304 may communicate with one another by way of the platform messaging architecture 306. The communication paths and flows may be secure and/or reliable. For example, message-oriented middleware server 504 may be configured to buffer, store, and/or asynchronously send messages in any suitable way. The message queues of message-oriented middleware server 504 described above may allow platform services to send and receive messages between one another asynchronously, which may allow a source platform service to send messages without regard for the availability and/or location of destination platform services or their readiness to receive messages. Additionally, the asynchronous messaging allows messages to be delivered even if a destination platform service fails to receive the message immediately. For example, a message may remain in a queue until a destination platform service is ready to read the message from the queue.

As mentioned, in certain implementations, message-based communications bus 502 may include bus interfaces 506 implemented as individualized messaging layers within respective platform services 304. In other examples, message-based communications bus 502 may be implemented as a discrete communication bus platform service. In such implementations, platform services 304 may be configured to communicate with the communication bus platform service and to rely on the communication bus platform service to route messages between the platform services 304. This decoupling of message-based communications bus 502 from platform services 304 may be referred to as "platformization" and may facilitate independent modification of (e.g., updates to) message-based communications bus 502 and/or platform services 304. In addition, platform system 302 may run multiple versions of message-based communications bus 502 within platform system 302. This may provide flexibility to platform services 304 to select which of the available message-based communications bus 502 versions to use.

In some examples, message-oriented middleware server 504 may be implemented as a discrete communication bus platform service. In implementations in which both message-based communications bus 502 and message-oriented middleware server 504 are implemented as platform services, message-based communications bus 502 and message-oriented middleware server 504 may be implemented by disparate platform services or integrated into a single platform service.

In addition to providing a communicative architecture to facilitate message transmission between platform services as described herein, platform messaging architecture 306 may also be configured to provide one or more other, non-communicative services as may serve a particular implementation. For example, in some implementations of platform system 302, all messages between platform services 304 may be communicated by way of platform messaging architecture 306. Such implementations may allow platform messaging architecture 306 to facilitate an audit on past and ongoing communications within platform system 302. Data obtained from such an audit may include status information and/or statistics characterizing communications between platform services and may thus be used as business intelligence to allow, for example, an M2M solutions provider to modify certain platform services 304 and/or platform system 302 to be more efficient. Additionally or alternatively, platform messaging architecture 306 may be configured to limit or otherwise control communications between platform services. For example, if an M2M solutions provider determines (e.g., via an audit of recent communications on platform messaging architecture 306) that a particular platform service is overusing platform messaging architecture 306 (e.g., "talking too much"), the M2M solutions provider may limit or otherwise arbitrate the number of messages the platform service is able to send for some amount of time. This limiting and/or arbitrating may be done in any suitable way and for any suitable amount of time. Platform messaging architecture 306 may further facilitate communicative and non-communicative functionality within platform system 302 in any manner that serves a particular implementation.

An M2M platform provided by a platform system may be said to have and operate in accordance with a functionality set, which may comprise a set of functions provided by a set of platform services operating in accordance with configuration data for the set of platform services and a platform messaging architecture that communicatively interconnects the set of platform services. For example, platform system 302 of FIG. 3 may provide M2M platform 106 that has a functionality set comprising the set of functions provided by platform messaging architecture 306 and by platform services 304 operating in accordance with configuration data for the set of platform services 304. The functionality set of the M2M platform may be used by an M2M solution (e.g., M2M solution 108) built on the M2M platform (e.g., M2M platform 106).

An M2M platform service provider may want to change the functionality set of an M2M platform provided by a platform system operated by the service provider. For example, the service provider may want to add, remove, and/or modify one or more functions of the M2M platform. Such a change may be desirable for a variety of reasons. For instance, the change may create an M2M platform functionality set that is capable of supporting a new customer service being added to an M2M solution.

In certain scenarios, a dynamical, seamless change to the functionality set of the M2M platform during runtime of the M2M platform may be desirable. For example, an M2M platform service provider may want to effectuate a change to the functionality set of the M2M platform during and without interrupting runtime operation of the M2M platform. Effectuating the change in this manner may be beneficial to the service provider and to one or more customers of the service provider. The M2M systems and methods described herein may be configured to effectuate a change to the functionality set of the M2M platform in this manner.

Figure 6:
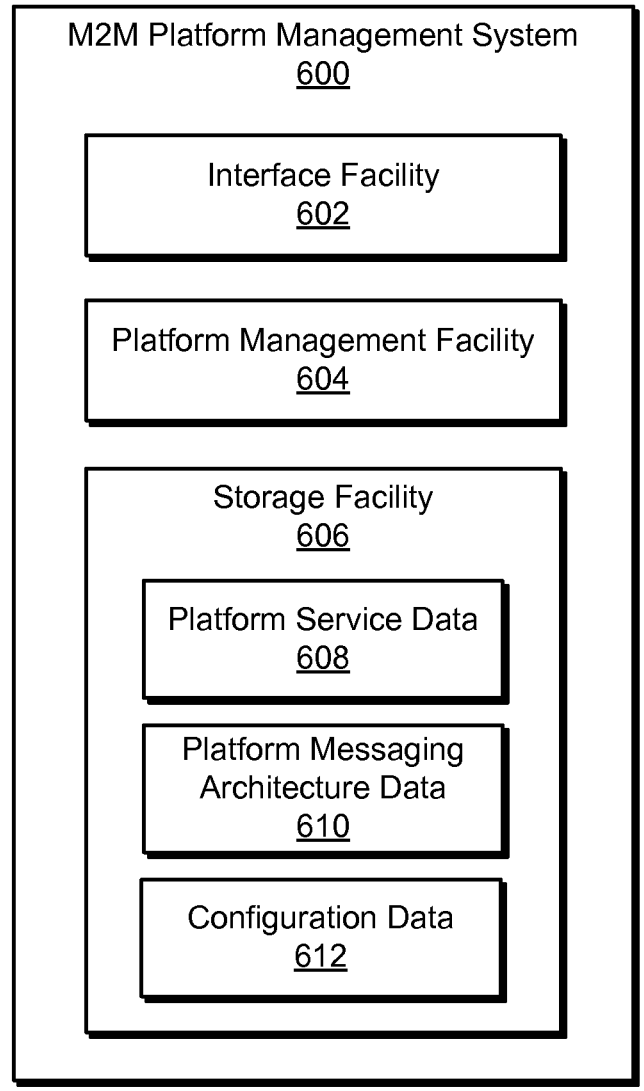
FIG. 6 illustrates an exemplary M2M platform management system according to principles disclosed herein.

FIG. 6 illustrates an exemplary M2M platform management system 600 configured to change the functionality set of an M2M platform dynamically and seamlessly during runtime of the M2M platform. M2M platform management system 600 may be implemented by M2M solutions provider subsystem 102, M2M server subsystem 206, and/or platform system 302, or by one or more computing devices configured to communicate with M2M solutions provider subsystem 102, M2M server subsystem 206, and/or platform system 302.

As shown in FIG. 6, M2M platform management system 600 may include, without limitation, an interface facility 602, a platform management facility 604, and a storage facility 606 selectively and communicatively coupled to one another. It will be recognized that although facilities 602-606 are shown to be separate facilities in FIG. 6, any of facilities 602-606 may be combined into fewer facilities, such as into a single facility, or divided into more facilities as may serve a particular implementation.

In certain examples, one or more elements of M2M platform management system 600 may be implemented as a platform service or as part of a platform service included within a set of platform services associated with an M2M platform. For example, platform management facility 604 may be implemented as a platform service (e.g., a configuration management platform service) included in the set of platform services 304 and connected to platform messaging architecture 306. Examples of such implementations are described herein.

Storage facility 606 may be configured to maintain and/or store platform service data 608 representative of a set of platform services of an M2M platform (e.g., computing code for the set of platform services configured to be executed by a platform system to operate the M2M platform), platform messaging architecture data 610 representative of a platform messaging architecture of the M2M platform (e.g., computing code configured to be executed by the platform system to operate the platform messaging architecture of the M2M platform), and configuration data 612 for the set of platform services. Storage facility 606 may maintain additional or alternative data as may serve a particular implementation.

While storage facility 606, platform service data 608, platform messaging architecture data 610, and configuration data 612 are shown to be included in M2M platform management system 600 in FIG. 6, this is illustrative only. In other implementations, any of storage facility 606, platform service data 608, platform messaging architecture data 610, and configuration data 612 may be external to and accessible by M2M platform management system 600 (e.g., by platform management facility 604).

Configuration data 612 for a set of platform services may include any information descriptive and/or otherwise associated with the set of platform services. For example, configuration data 612 may include routing logic configured to govern how platform messages are routed within an M2M platform (e.g., how platform messages are routed between one or more platform services included in the set of platform services). To illustrate, a platform service included in the set of platform services may use configuration data 612 to make routing decisions, such as by determining destinations (e.g., specific platform services 304) for platform messages and routing the platform messages to those destinations. As an example, a first platform service (e.g., an M2M client gateway service such as gateway service 406-1 of FIG. 4) may receive an M2M message from an M2M client 208 by way of network 210. The first platform service may use configuration data 612 to determine how to process the message. For example, from the configuration data 612 and the message, the first platform service may determine to route and/or how to route the message to a second platform service. The first platform service may then route the message to the second platform service either directly or by way of platform messaging architecture 306, such as described herein.

In certain implementations, the routing of M2M messages between platform services may be additionally or alternatively based on data contained in the messages to be routed. For example, a message to be routed may carry data (e.g., data field values) and/or logic (e.g., XML-packaged code instructions) configured to be used by a platform service to make routing decisions for the message. Such routing of messages between platform services may be referred to as a "data-driven" routing approach.

In certain examples, configuration data 612 for a set of platform services may include a platform service directory that specifies information for the platform services included in the set of platform services. The platform service directory may specify any information associated with the set of platform services. For example, the platform service directory may specify platform service identifiers (e.g., names) for the platform services. A platform service may be configured to use the platform service directory to identify and invoke (e.g., issue calls to) other platform services included in the set of platform services.

Interface facility 602 may be configured to provide one or more interfaces by way of which a user and/or computing device may communicate with M2M platform management system 600. For example, interface facility 602 may provide a user interface (e.g., a graphical user interface) through which a user (e.g., a M2M platform service provider representative) may provide user input (e.g., data) for use by M2M platform management system 600 to manage an M2M platform, such as by changing the functionality set of the M2M platform based on the input.

In certain examples, the input may include data representative of an update to be made to the functionality set of the M2M platform. For instance, the input may include data representative of an update to be made to one or more of the platform message architecture of the M2M platform, the set of platform services of the M2M platform, and the configuration data for the set of platform services. The input may be received in any suitable form, such as one or more data files (e.g., a configuration data file) and/or executable computing code (e.g., computing code configured to be executed to provide a platform service). Examples of such input and corresponding updates to an M2M platform are described herein. Interface facility 602 may be configured to provide any form of user interface suitable for receiving such input.

Platform management facility 604 may be configured to manage an M2M platform, such as by managing the functionality set of the M2M platform. For example, platform management facility 604 may manage the functionality set of the M2M platform by updating the functionality set of the M2M platform, including in response to user input received from interface facility 602. Platform management facility 604 may update the functionality set of the M2M platform by modifying any of platform service data 608, platform messaging architecture data 610, and configuration data 612 in storage facility 606 in a manner that facilitates deployment of an updated functionality set such that the platform system providing the M2M platform uses the modified data to provide the M2M platform with the updated functionality set.

In certain examples, an update to the functionality set of the M2M platform may be performed dynamically during runtime of the M2M platform to seamlessly transition the M2M platform from operating in accordance with the functionality set to operating in accordance with the updated functionality set. For example, during runtime operation of the M2M platform, interface facility 602 may receive a user request to update the functionality set of the M2M platform. The request may include data representative of the update. Platform management facility 604 may receive the data representative of the update from interface facility 602 and respond by dynamically updating the functionality set (e.g., by modifying any of platform service data 608, platform messaging architecture data 610, and configuration data 612) on-demand during runtime operation of the M2M platform based on the data representative of the update to seamlessly transition from the M2M platform operating in accordance with the functionality set to operating in accordance with the updated functionality set. Examples of such updates will now be described.

Figure 7:
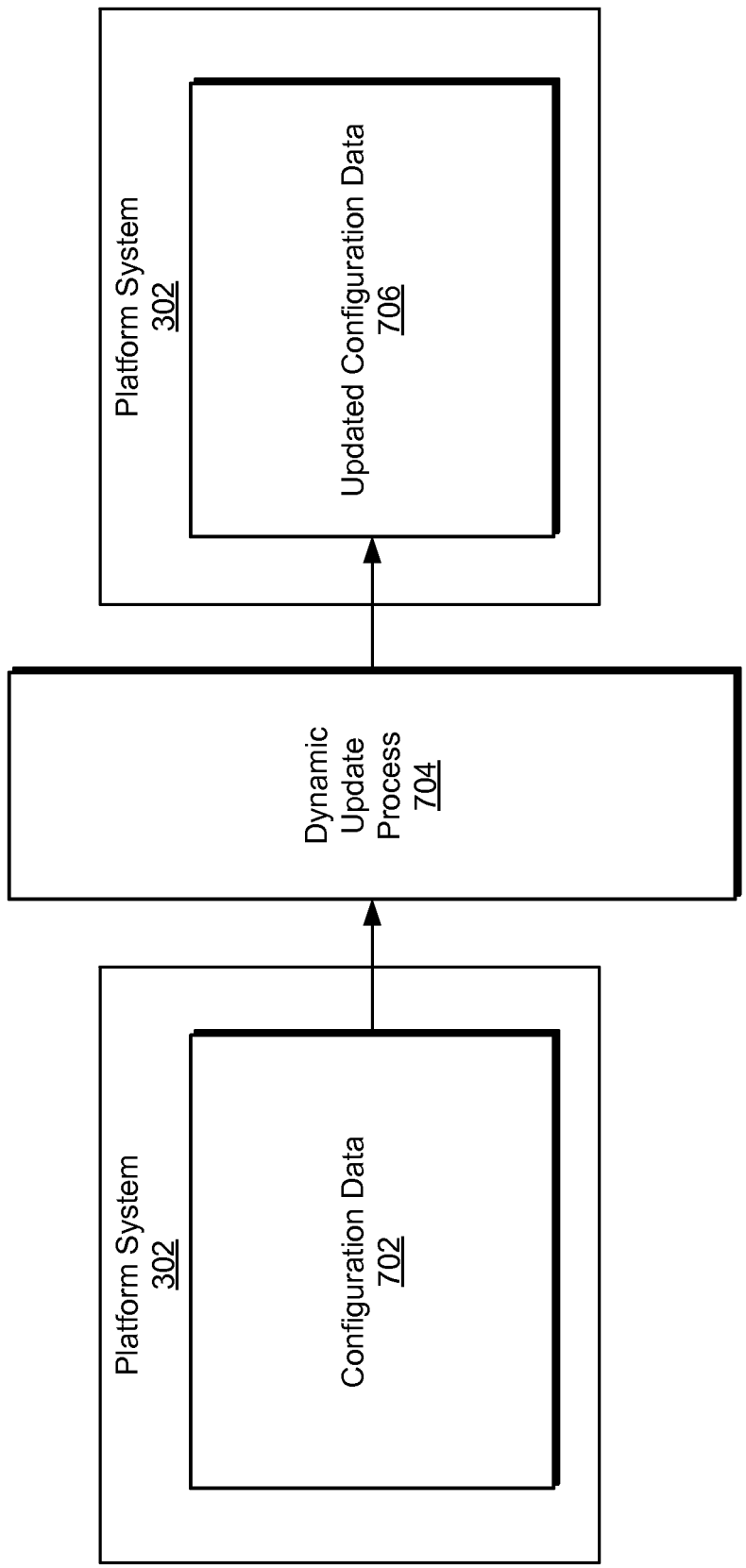
FIG. 7 illustrates configuration data subjected to a dynamic update process to create updated configuration data in a platform system according to principles disclosed herein.

FIG. 7 illustrates configuration data 702 included in platform system 302 being subjected to a dynamic update process 704 to create updated configuration data 706 in platform system 302. Configuration data 702 may include all or a subset of configuration data 612 shown in FIG. 6.

In certain examples, the dynamic update process 704 may be performed by M2M platform management system 600. To illustrate an example of the dynamic update process 704, an M2M platform service provider may define an update to be applied to configuration data 702 of platform system 302 and provide (e.g., upload) data representative of the update to M2M platform management system 600 by way of a user interface provided by interface facility 602. Interface facility 602 may receive and forward the data representative of the update to platform management facility 604.

Platform management facility 604 may receive the data representative of the update and apply the update to configuration data 702 of platform system 302 such that configuration data 702 is updated to create updated configuration data 706 of platform system 302. In certain examples, the updating may include platform management facility 604 modifying routing logic included in configuration data 702 to create updated configuration data 706 having modified routing logic. Additionally or alternatively, the updating may include platform management facility 604 modifying a platform service directory included in configuration data 702 to create updated configuration data 706 having a modified platform service directory.

Figure 8:
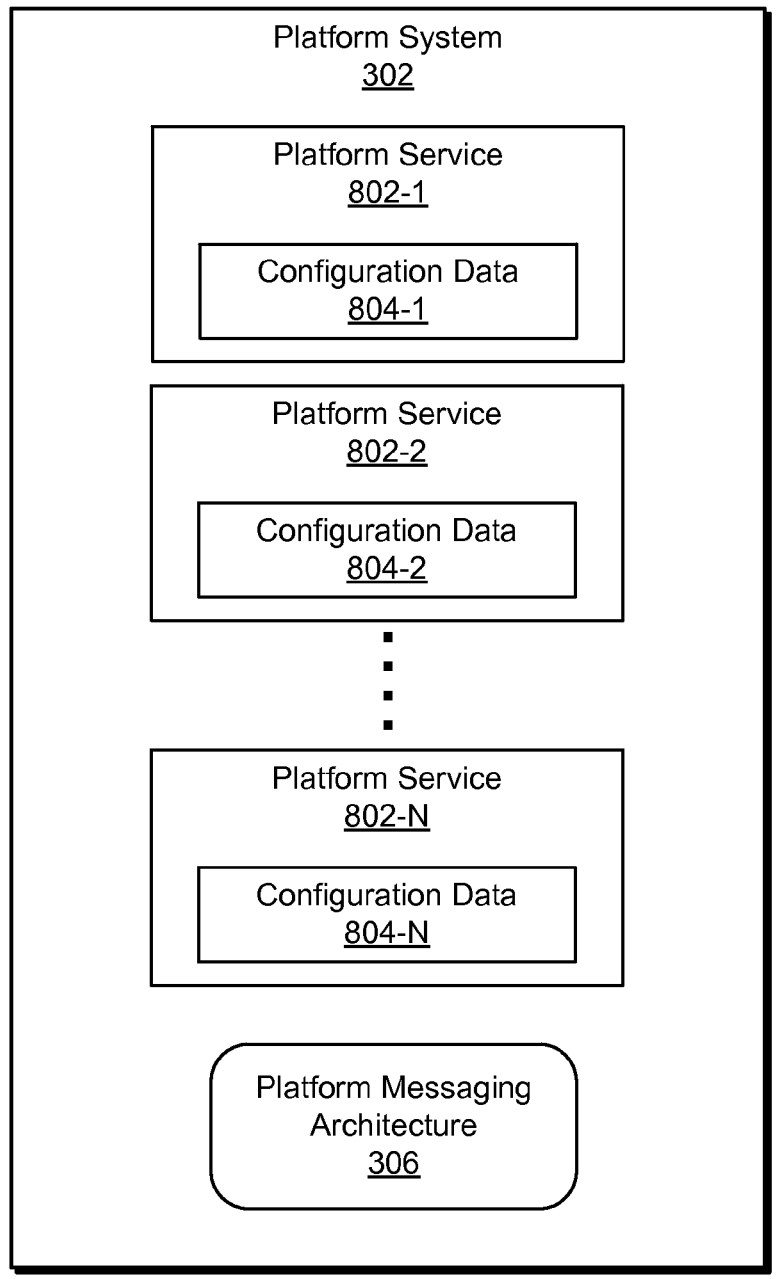
FIG. 8 illustrates an exemplary implementation of a platform system according to principles disclosed herein.

In certain implementations, as part of dynamic update process 704, platform management facility 604 may distribute data representative of a configuration data update to one or more platform services included in platform system 302. To illustrate, FIG. 8 shows an implementation 800 of platform system 302 in which platform system 302 includes a set of platform services 802 (e.g., platform services 802-1 through 802-N) that includes respective instances 804 (e.g., instances 804-1 through 804-N) of configuration data. As shown, each platform service 802 may include a discrete instance 804 of configuration data. The instances 804 of configuration data may be copies of the same configuration data. Alternatively, the instances 804 of configuration data may be heterogeneous instances of configuration data, with each platform service 802 maintaining an instance 804 of configuration data that is specific to that platform service 802.

Figure 9:
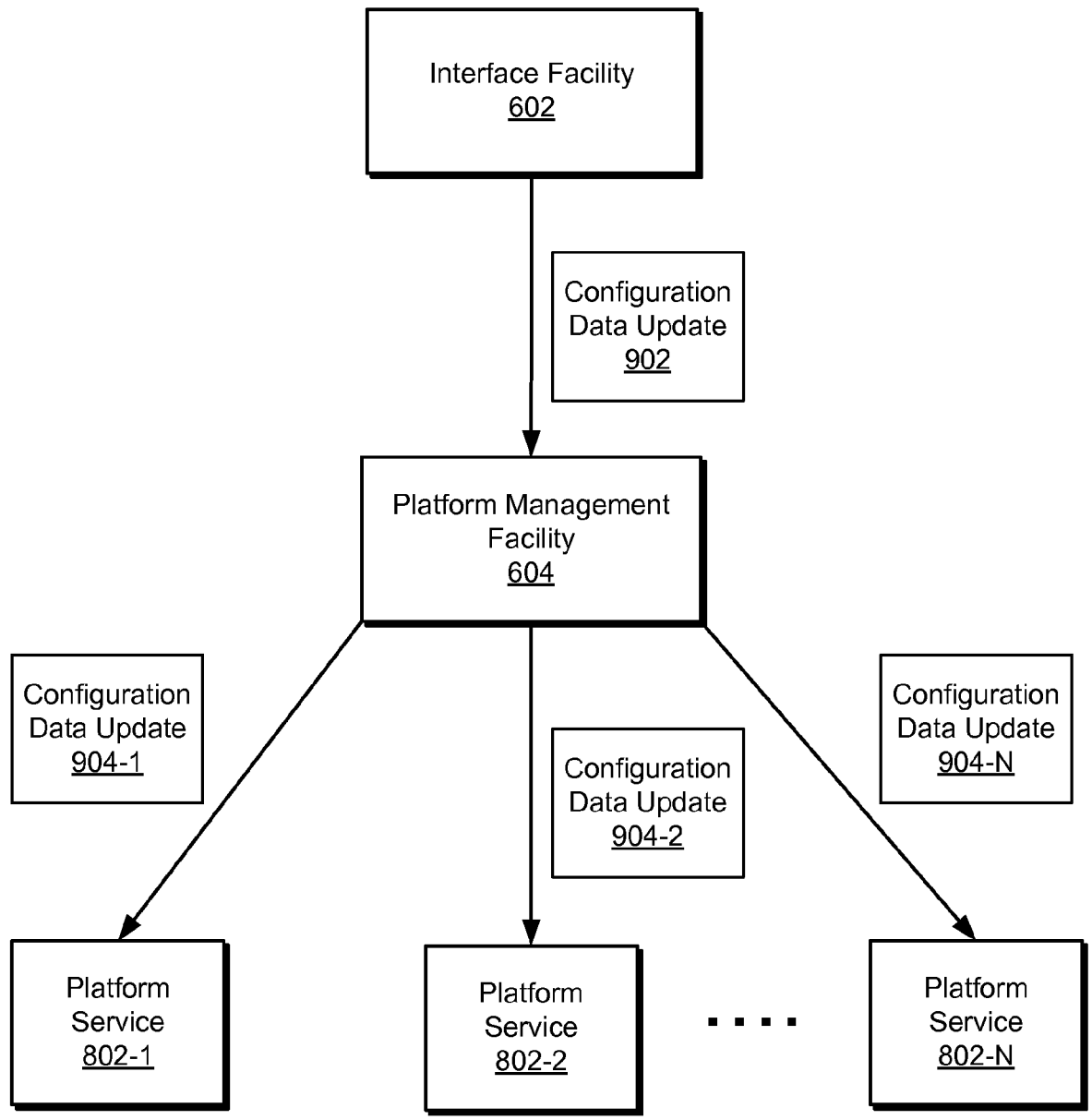
FIG. 9 illustrates an exemplary distribution of a configuration data update to platform services according to principles disclosed herein.

As part of the dynamic update process 704 of FIG. 7, platform management facility 604 may distribute data representative of an update to configuration data to one or more platform services included in the set of platform service 802. For example, FIG. 9 illustrates platform management facility 604 receiving a configuration data update 902 from interface facility 602. Platform management facility 604 may process the update 902, such as by distributing configuration data updates 904 (e.g., configuration data updates 904-1 through 904-N) representative of configuration data update 902 to platform services 802. In some examples, data representative of the update may be distributed by platform management facility 604 to platform services 802 by way of platform messaging architecture 306, such as by sending one or more messages to platform services 802 by way of platform messaging architecture 306.

In certain examples, the configuration data updates 904 distributed by platform management facility 604 may include one or more copies of the configuration data update 902 received by platform management facility 604 from interface facility 602. In alternative examples, the configuration data updates 904 distributed by platform management facility 604 may include portions of configuration data update 902 that are specific to respective platform services 802.

Platform services 802 may be configured to receive and use the distributed data representative of the update to update respective instances 804 of configuration data maintained by platform services 802. Platform services 802 may perform the update in any suitable way, such as by modifying or replacing the respective instances 804 of configuration data included in the platform services 802. After the update is received and applied by platform services 802, the platform services 802 operate in accordance with the respective, updated instances of configuration data.

In certain examples, platform management facility 604 may be configured to instruct one or more platform services 802 how to process distributed configuration data updates 904. For example, along with distribution of the configuration data updates 904, platform management facility 604 may provide instructions to platform services 802 to instruct platform services 802 to use configuration data updates 904 to update instances of configuration data 804 maintained by platform services 802 to create updated instances configuration data.

In alternative examples, one or more platform services 802 may include internal logic configured to be used by the platform services 802 to determine how to process distributed (e.g., broadcast) configuration data updates 904. For example, platform service 802-1 may include internal logic that platform service 802-1 uses to determine whether and/or how to apply received configuration data update 904-1 to an instance 804-1 of configuration data maintained by platform service 802-1.

Figure 10:
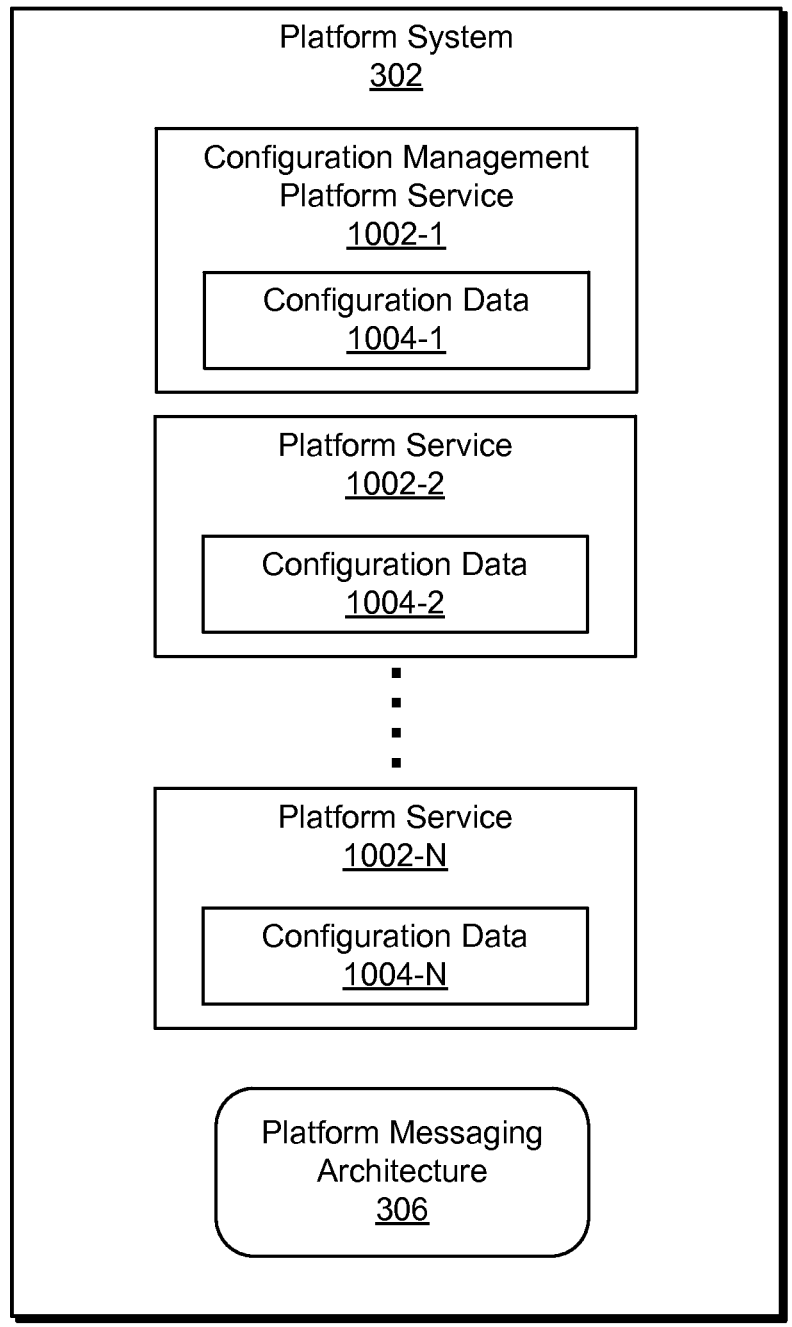
FIG. 10 illustrates an exemplary implementation of a platform system according to principles disclosed herein.

As mentioned above, in certain implementations, platform management facility 604 may be implemented as a platform service or as part of a platform service. FIG. 10 illustrates an implementation 1000 of platform system 302 that includes a set of platform services 1002 (e.g., platform services 1002-1 through 1002-N). As shown, platform service 1002-1 within the set of platform services 1002 comprises a configuration management platform service 1002-1, which may implement platform management facility 604.

As further shown, the set of platform services 1002 includes respective instances 1004 (e.g., instances 1004-1 through 1004-N) of configuration data. As shown, each platform service 1002 may include a discrete instance 1004 of configuration data. In certain examples, configuration data instance 1004-1 may comprise a master set of configuration data for platform system 302 maintained by configuration management platform service 1002-1 and used to update other instances 1004-2 through 1004-N of configuration data maintained by other platform services 1002-2 through 1002-N.

Figure 11:
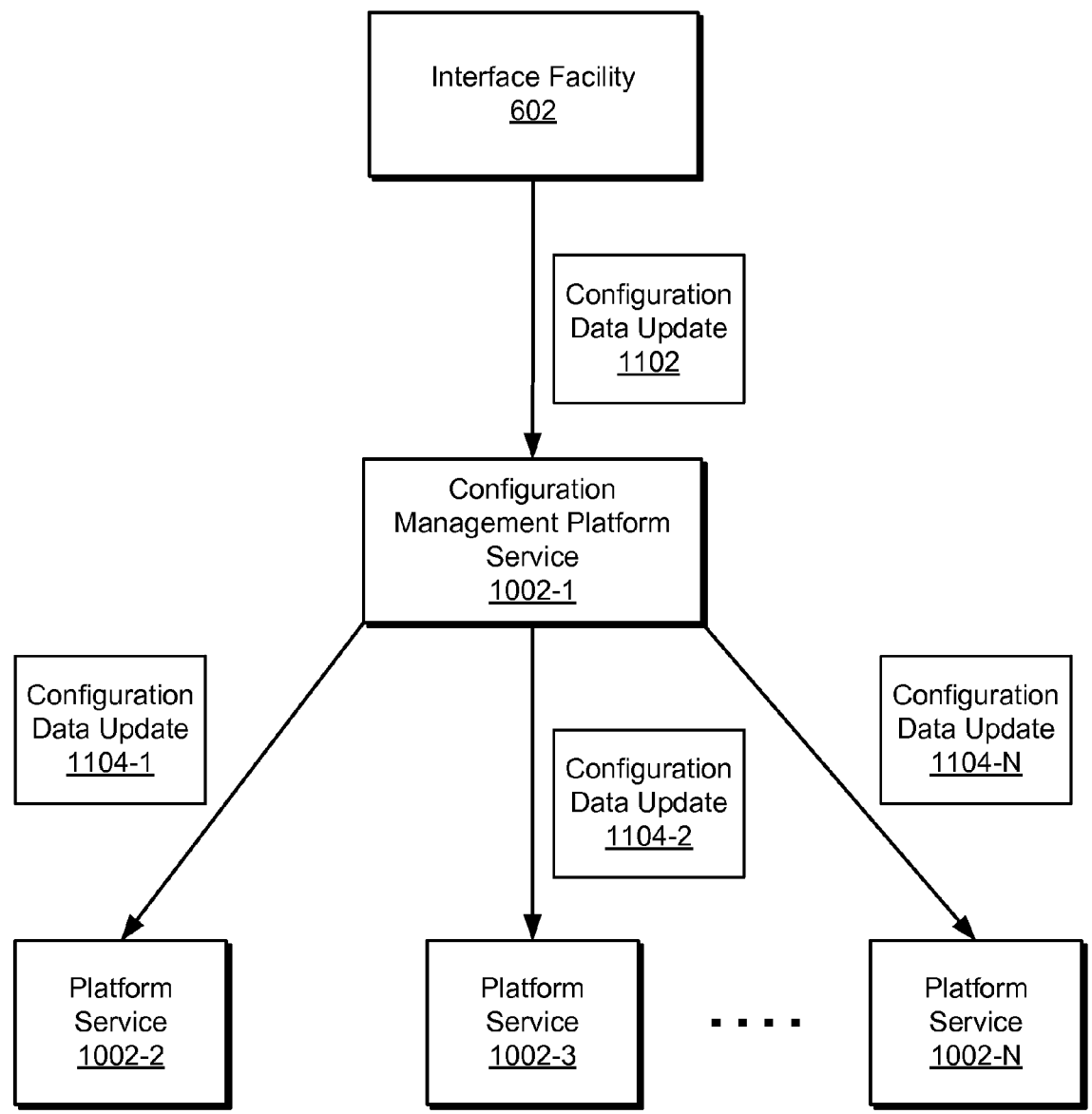
FIG. 11 illustrates an exemplary distribution of a configuration data update to platform services according to principles disclosed herein.

For example, as part of the dynamic update process 704, configuration management platform service 1002-1 may receive a configuration data update 1102 from interface facility 602 as shown in FIG. 11. Configuration management platform service 1002-1 may use the update 1102 to update a master configuration data instance 1004-1 in accordance with the update 1102. Configuration management platform service 1002-1 may then distribute configuration data updates 1104 (e.g., configuration data updates 1104-1 through 1104-N) to other platform services 1002 (e.g., platform services 1002-2 through 1002-N) of platform system 302. The recipient platform services 1002 may be configured to receive and use the distributed data representative of the update to update respective instances 1004 of configuration data maintained by the recipient platform services 1002. The recipient platform services 1002 may perform the update in any suitable way, such as described herein. After the update is received and applied by the recipient platform services 1002, the recipient platform services 1002 operate in accordance with respective, updated instances of configuration data.

In some examples, data representative of the update may be distributed by configuration management platform service 1002-1 to one or more other platform services 1002 by way of platform messaging architecture 306, such as by sending one or more messages to the one or more other platform services 1002 by way of platform messaging architecture 306.

In certain implementations, configuration data for an M2M platform may be maintained at a centralized location for access and use by one or more platform services included in a set of platform services. In such implementations, platform services may access the centralized configuration data and avoid maintaining individual, local instances of configuration data.

Figure 12:
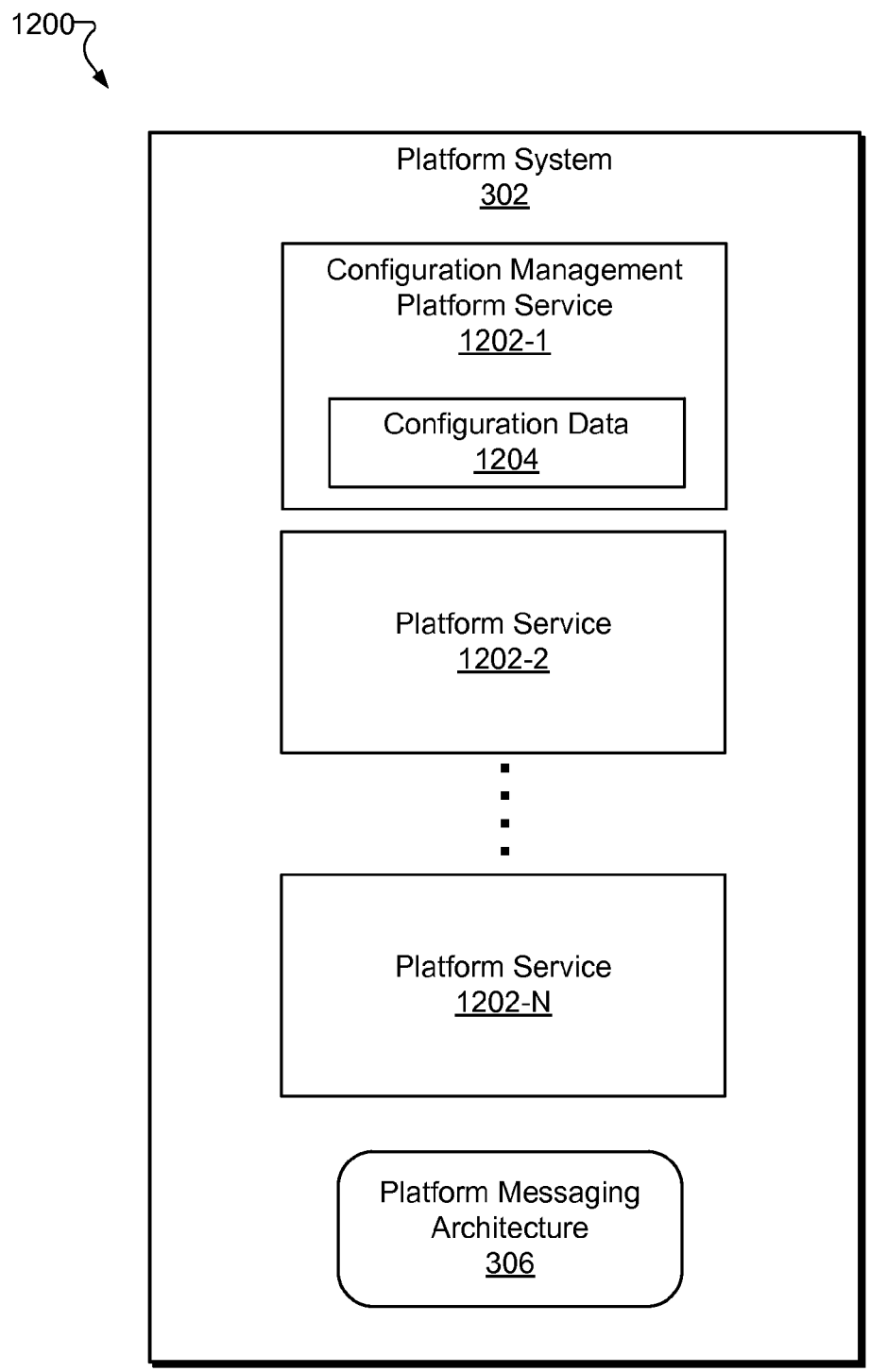
FIG. 12 illustrates an exemplary implementation of a platform system according to principles disclosed herein.

To illustrate, FIG. 12 shows an implementation 1200 of platform system 302 in which platform system 302 includes a set of platform services 1202 (e.g., platform services 1202-1 through 1202-N). As shown, platform services 1202 may include a configuration management platform service 1202-1, which may implement platform management facility 604 as described herein. Configuration management platform service 1202-1 may maintain a master, centralized instance 1204 of configuration data for platform system 302. Other platform services included in the set of platform services 1202 (e.g., platform services 1202-2 through 1202-N) may be configured to access configuration data 1204 from configuration management platform service 1202-1.

For implementation 1200, the dynamic update process 704 of FIG. 7 may include configuration management platform service 1202-1 receiving data representative of an update to configuration data and using the received data to apply the update to the instance 1204 of configuration data maintained by configuration management platform service 1202-1 such that the updated configuration data is available to other platform services included in the set of platform services 1202.

Figure 13:
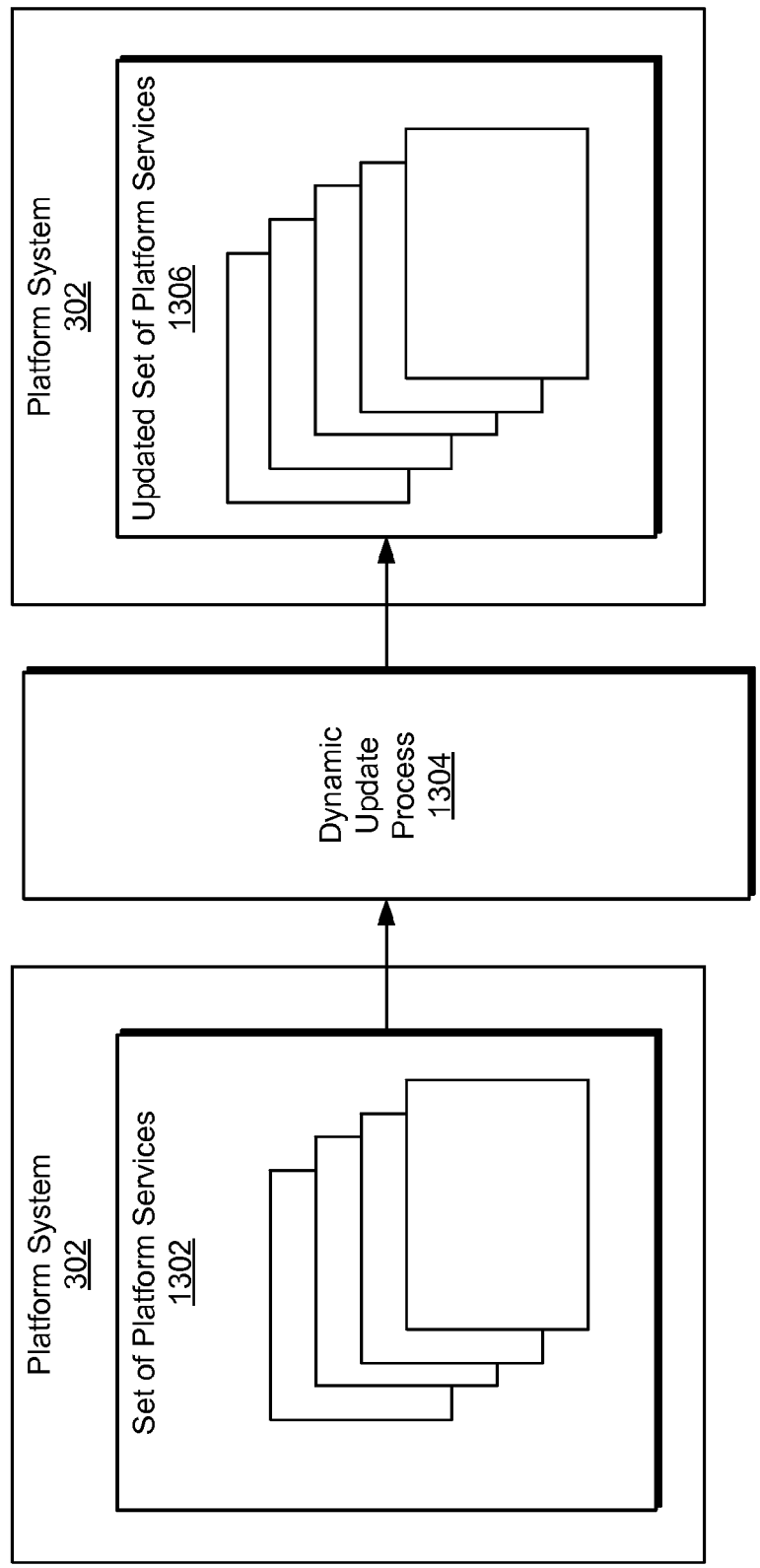
FIG. 13 illustrates a set of platform services subjected to a dynamic update process to create an updated set of platform services according to principles disclosed herein.

FIG. 13 illustrates a set of platform services 1302 included in an implementation of platform system 302 being subjected to a dynamic update process 1304 to create an updated set of platform services 1306 in platform system 302. In certain examples, the dynamic update process 1304 may be performed by M2M platform management system 600. To illustrate an example of the dynamic update process 1304, an M2M platform service provider may define an update to be applied to the set of platform services 1302 of platform system 302 and provide (e.g., upload) data representative of the update to M2M platform management system 600 by way of a user interface provided by interface facility 602. Interface facility 602 may receive and forward the data representative of the update to platform management facility 604.

Platform management facility 604 may receive the data representative of the update and apply the update to the set of platform services 1302 of platform system 302 such that the set of platform services 1302 is updated to create the updated set of platform services 1306. The updating may include platform management facility 604 modifying one or more of the platform services included in a set of platform services 1302, adding data representative of one or more new platform services to the set of platform services 1302, and/or removing one or more platform services from the set of platform services 1302.

As an example, an M2M platform service provider may define a new platform service to be added to the set of platform services 1302 and upload data representative of the new platform service (e.g., executable code) to M2M platform management system 600 by way of a user interface provided by interface facility 602. Platform management facility 604 may receive the data representative of the new platform service from interface facility 602 and deploy the new platform service to platform system 302. The deployment may be performed by platform management facility 604 in any suitable way. For example, platform management facility 604 may modify platform service data 608 to include data representative of the new platform service and initiate operation of the new platform service within platform system 302. Upon starting, the new platform service may automatically connect to platform messaging architecture 306 and begin to perform one or more functions of the new platform service.

The dynamic update process 1304 may be performed during runtime operation of an M2M platform provided by platform system 302 to seamlessly transition the M2M platform from operating in accordance with the set of platform services 1302 to operating in accordance with the updated set of platform services 1306.

In certain examples, dynamic update processes 704 and 1304 may be performed in conjunction one with another to update platform system 302. For example, dynamic update process 1304 may be performed as described above to add a new platform service to the set of platform services 302 of platform system 302. Dynamic update process 704 may also be performed to update configuration data 702 of platform system 302 in accordance with the addition of the new platform service to platform system 302. For example, configuration data 702 may be updated such that routing logic and/or a platform service directory included in the updated configuration data 706 accounts for the new platform service (e.g., by adding a routing option and/or a directory entry for the new platform service).

Figure 14:
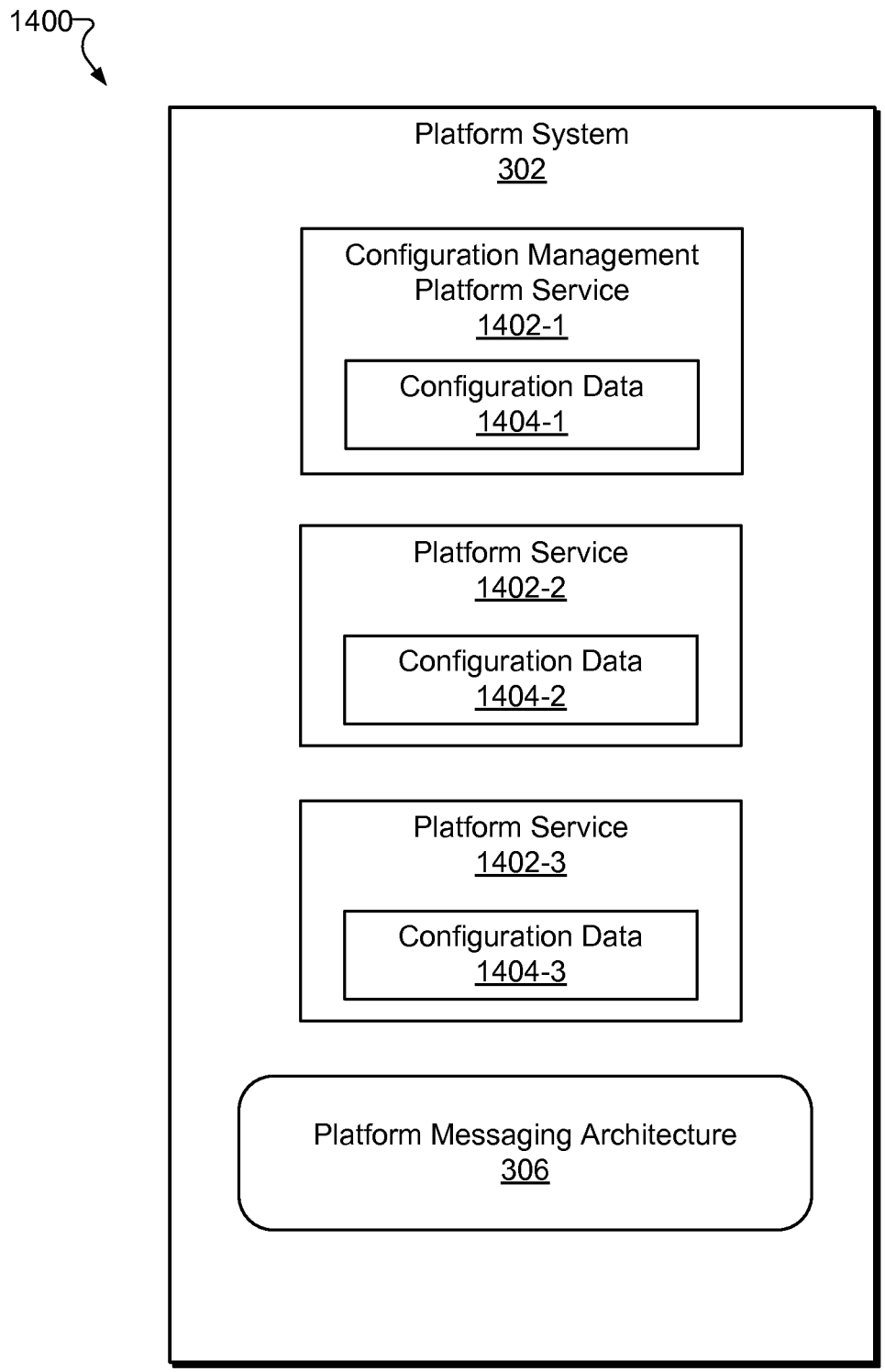
FIG. 14 illustrates an exemplary implementation of a platform system before application of an update according to principles disclosed herein.
Figure 15:
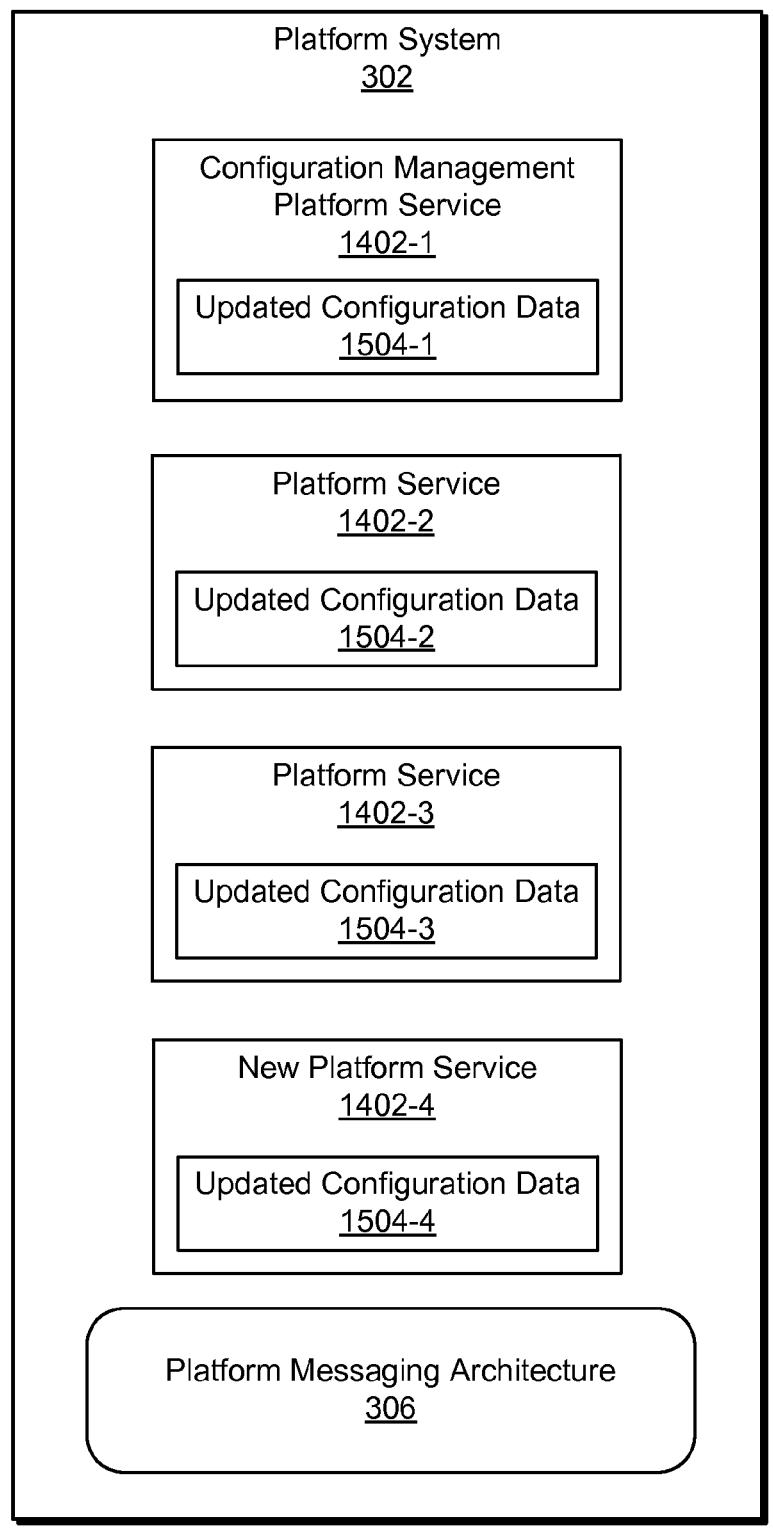
FIG. 15 illustrates an exemplary implementation of the platform system of FIG. 14 after application of an update according to principles disclosed herein.

To illustrate, FIG. 14 shows in implementation 1400 of platform system 302 in which platform system 302 includes a set of platform services 1402 (e.g., platform services 1402-1 through 1402-3) that includes respective instances 1404 (e.g., instances 1404-1 through 1404-3) of configuration data. Dynamic update process 1304 may be performed to add a new platform service to the set of platform services 1402. FIG. 15 shows an implementation 1500 of platform system 302 in which platform system 302 includes an updated set of platform services 1402 that includes the newly added platform service (i.e., platform service 1402-4).

Dynamic update process 704 may be performed to update the instances 1404 of configuration data included in implementation 1400 of platform system 302 to create updated configuration data that accounts for newly added platform service 1402-4. FIG. 15 illustrates platform system 302 to include updated instances 1504 (e.g., 1504-1 through 1504-4)

of configuration data, which account for newly added platform service 1402-4. For example, before dynamic update process 704 is performed, one or more instances 1404 of configuration data may not include information about newly added platform service 1402-4. Accordingly, platform services 1402-1, 1402-2, and 1402-3 may not be configured to route platform messages to newly added platform service 1402-4 (e.g., by way of platform messaging architecture 306). In particular, the routing logic included in the instances 1404 of configuration data may lack routing options for newly added platform service 1402-4.

The performance of dynamic update process 704 may add such information about newly added platform service 1402-4 to the instances 1404 of configuration data to create the updated instances 1504 of configuration data shown in FIG. 15. For examples, routing options and/or a platform service directory entry may be added to instances 1404 of configuration data (e.g., to routing logic and/or a platform service directory included in the configuration data) such that the updated instances 1504 of configuration data may include the routing options and/or a platform service directory entry for the newly added platform service 1402-4. Accordingly, platform services 1402-1, 1402-2, and 1402-3 may be configured to route platform messages to newly added platform service 1402-4 (e.g., by way of platform messaging architecture 306).

In the above-described example, dynamic update processes 704 and 1304 may be performed in conjunction with one another in response to receipt of a single update or multiple updates by platform management facility 604.

As shown in FIG. 14, the set of platform services 1402 that is updated in the above-described example may include a configuration management platform service 1402-1, which may be configured to distribute updated configuration data to one or more platform services included in the set of platform services 1402, such as described herein.

By platform management facility 604 performing the dynamic update processes 704 and 1304 as described herein, platform system 302 may seamlessly transition, during runtime operation of an M2M platform provided by platform system 302, from operating the M2M platform in accordance with the set of services and the configuration data for the set of services shown in FIG. 14 to operating the M2M platform in accordance with the updated set of platform services and the updated configuration data for the updated set of platform services shown in FIG. 15.

Figure 16:
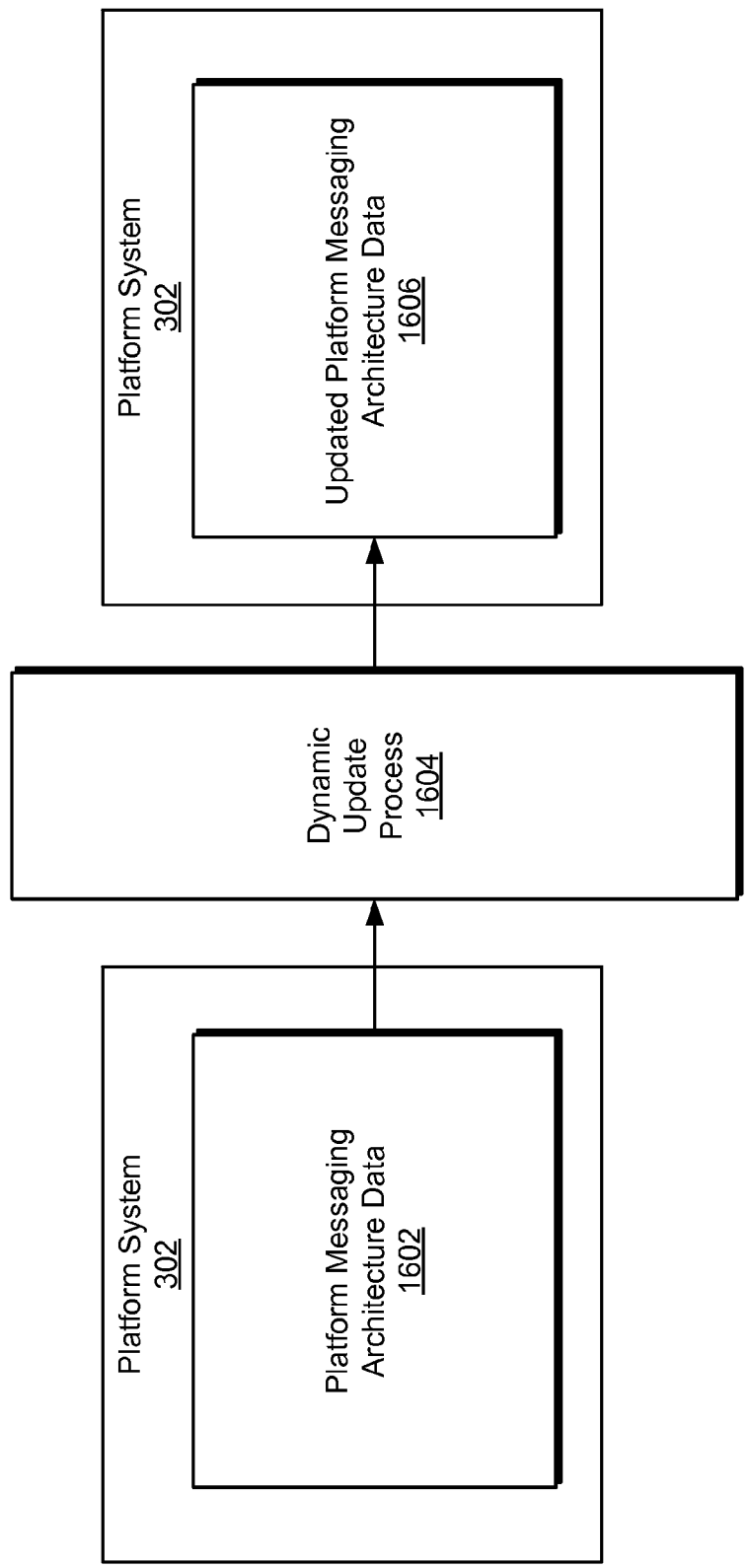
FIG. 16 illustrates platform messaging architecture data subjected to a dynamic update process to create updated platform messaging architecture data in a platform system according to principles disclosed herein.

FIG. 16 illustrates platform messaging architecture data 1602 included in platform system 302 being subjected to a dynamic update process 1604 to create updated platform messaging architecture data 1606 in platform system 302. Platform messaging architecture data 1602 may include all or a subset of the platform messaging architecture data 610 shown in FIG. 6.

In certain examples, the dynamic update process 1604 may be performed by M2M platform management system 600. To illustrate an example of the dynamic update process 1604, an M2M platform service provider may define an update to be applied to platform messaging architecture data 1602 of platform system 302 and provide (e.g., upload) data representative of the update to M2M platform management system 600 by way of a user interface provided by interface facility 602. Interface facility 602 may receive and forward the data representative of the update to platform management facility 604.

Platform management facility 604 may receive the data representative of the update and apply the update to platform messaging architecture data 1602 of platform system 302 such that platform messaging architecture data 1602 is updated to create updated platform messaging architecture data 1606 of platform system 302. In certain examples, the updating may include platform management facility 604 updating queues used by platform messaging architecture 306 for platform communications. For example, the updating may include adding a queue for an added platform service, removing a queue for a removed platform service, and/or changing a location of a queue for a platform service.

Figure 17:
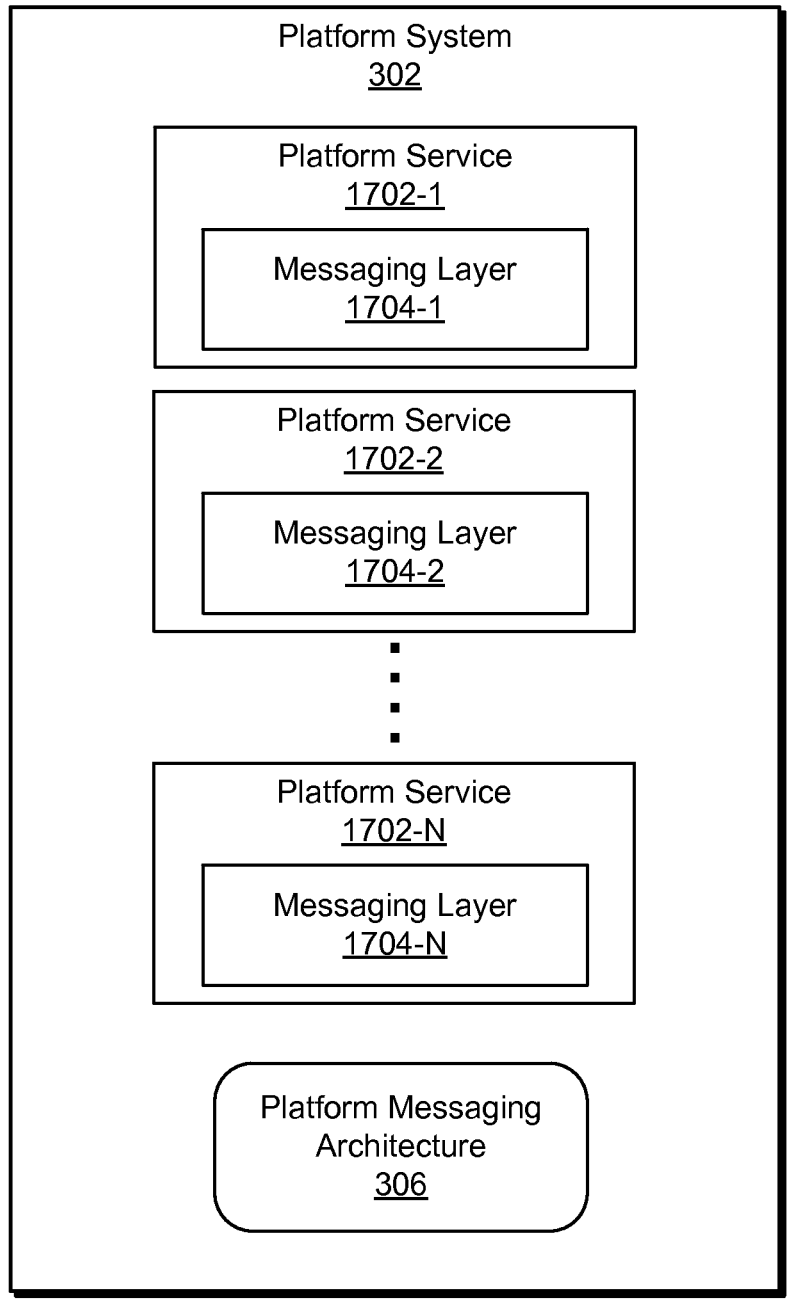
FIG. 17 illustrates an exemplary implementation of a platform system according to principles disclosed herein.

In certain implementations, components of platform messaging architecture 306 may be distributed across a set of platform services (e.g., as messaging layers within the platform services). For example, FIG. 17 illustrates an implementation 1700 of platform system 302 in which a set of platform services 1702 (e.g., platform services 1702-1 through 1702-N) includes respective messaging layers 1704 (e.g., messaging layers 1704-1 through 1704-N).

In implementations such as implementation 1700, as part of dynamic update process 1604 of FIG. 16, platform management facility 604 may distribute data representative of a platform messaging architecture update to one or more platform services included in platform system 302. For example, platform management facility 604 may distribute data representative of the update to platform services included in the set of platform services 1702 in any of the ways described above in relation to distribution of a configuration data update to a set of platform services (e.g., the distribution of a configuration data update illustrated in FIG. 9). In certain examples, platform management facility 604 may be implemented as a platform service included in the set of platform services 1702 and configured to distribute a platform messaging architecture update to other platform services included in the set of platform services 1702 in any of the ways described above in relation to distribution of a configuration data update to a set of platform services (e.g., the distribution of a configuration data update by a configuration management platform service 1002-1 illustrated in FIG. 11).

Figure 18:
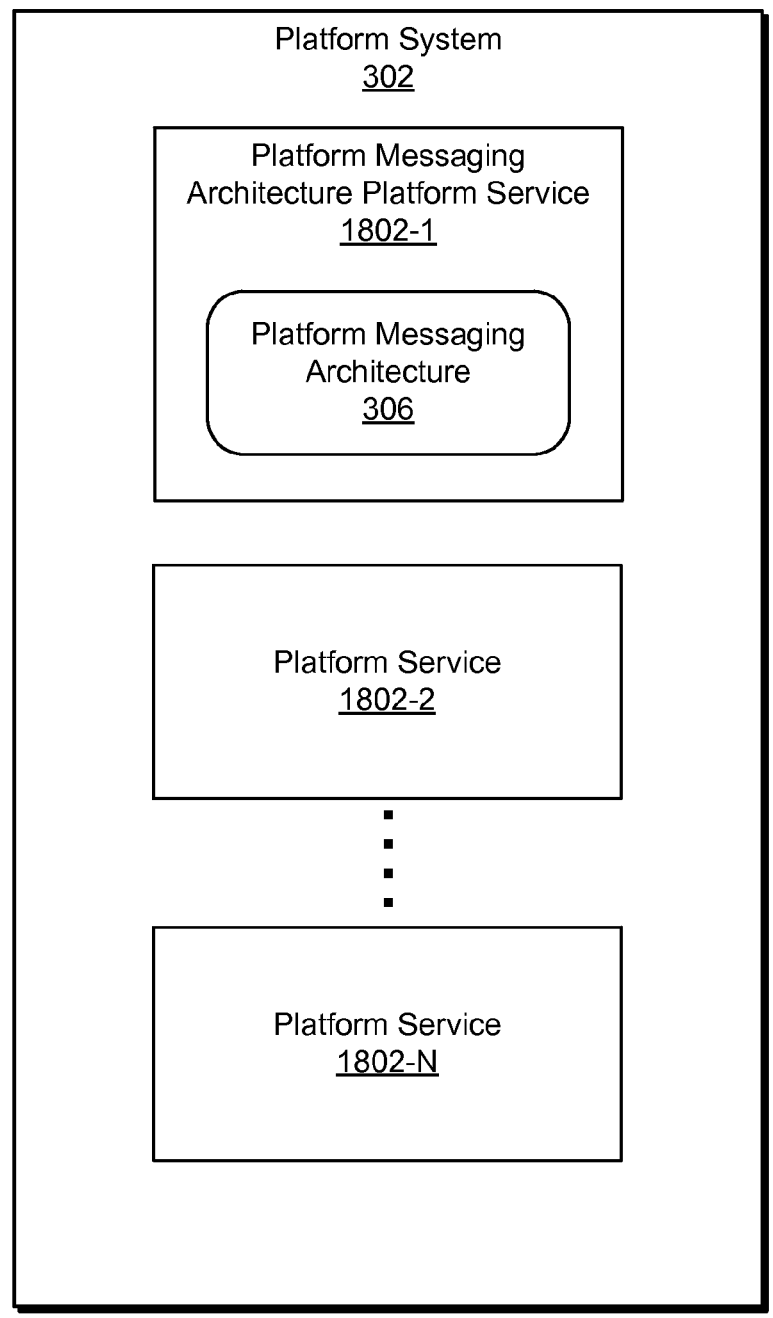
FIG. 18 illustrates an exemplary implementation of a platform system according to principles disclosed herein.

In alternative implementations, platform messaging architecture 306 may be implemented as a platform service within a set of platform services. To illustrate, FIG. 18 shows an implementation 1800 of platform system 302 in which platform system 302 includes a set of platform services 1802 (e.g., platform services 1802-1 through 1802-N). As shown, platform services 1802 may include a platform messaging architecture platform service 1802-1 that implements platform messaging architecture 306. Other platform services included in the set of platform services 1802 may be configured to access platform messaging architecture 306 by way of platform messaging architecture platform service 1802-1.

For implementation 1800, the dynamic update process 1604 of FIG. 16 may include platform management facility 604 receiving data representative of an update to platform messaging architecture 306 and using the received data to apply the update to platform messaging architecture 306 implemented by platform messaging architecture platform service 1802-1 such that an updated platform messaging architecture 306 is available to other platform services included in the set of platform services 1802 by way of platform messaging architecture platform service 1802-1.

By implementing platform messaging architecture 306 as a platform service, platform system 302 may be configured to concurrently maintain multiple versions of platform messaging architecture 306 such that other platform services included in the same set of platform services may use various versions of platform messaging architecture 306 by selecting which version(s) of platform messaging architecture 306 to use for platform communications.

In certain examples, dynamic update process 1604 may be performed in conjunction with one or more other dynamic update processes such as dynamic update processes 704 and 1304. For example, dynamic update process 1304 may be performed as described above to add a new platform service to the set of platform services 302 of platform system 302. Dynamic update process 704 may also be performed to update configuration data 702 of platform system 302 in accordance with the addition of the new platform service to platform system 302. Dynamic update process 1604 may also be performed to update platform messaging architecture 306 of platform system 302 in accordance with the addition of the new platform service to platform system 302. For example, platform messaging architecture 306 may be updated such that the updated platform messaging architecture 306 accounts for the new platform service (e.g., by adding a queue for the new platform service and/or other information about the new platform service).

In the above-described example, dynamic update processes 704, 1304, and 1604 may be performed in conjunction with one another in response to receipt of a single update or multiple updates by platform management facility 604.

A specific example of updating a functionality set of an M2M platform will now be described in relation to a particular M2M solution supported by the M2M platform. An M2M solutions provider may provide an M2M home monitoring solution to a customer. The M2M solution may allow the customer to use customer computing device 202 shown in FIG. 3 to access and consume information about customer assets at the customer's home. Data representative of the information about the home may be obtained by and/or from customer assets (e.g., consumer appliances and/or electronics) at the home and transmitted from M2M clients 208 communicatively coupled to the customer assets to M2M server subsystem 206, which may process and make the information accessible to customer computing device 202.

The M2M solution may be built on an M2M platform provided by an M2M platform service provider (which may be the same or a different entity as the M2M solutions provider). Accordingly, M2M communications associated with the solution may be transported from M2M clients 208 to M2M server subsystem 206 and/or from M2M server subsystem 206 to customer computing device 202 by way of the M2M platform.

The M2M solutions provider may want to add a new customer service to the M2M solution. For example, the M2M solutions provider may want to add a customer service that collects and provides home temperature information for access by customer computing device 202.

To support such a new customer service, the M2M platform service provider may want to update the functionality set of the M2M platform with one or more additional functions that support the new customer service. The M2M platform service provider may define a new platform service, such as a home temperature monitoring platform service (e.g., executable computing code configured to be executed to provide home temperature monitoring functions). The M2M platform service provider may upload data representative of the new platform service to M2M platform management system 600 by way of a user interface. M2M platform management system 600 may deploy the new platform service in any of the ways described herein.

The M2M platform service provider may also define an update to configuration data and upload data representative of the configuration data update (e.g., a configuration data file) to M2M platform management system 600 by way of a user interface. M2M platform management system 600 may update the configuration data of the M2M platform based on the update and in any of the ways described herein.

The updated configuration data may account for the new platform service. For example, a gateway platform service may use updated configuration data to take the new platform service into account when making message routing decisions. To illustrate, the gateway platform service may receive an M2M message from an M2M client, determine that the M2M message includes data representative of home temperature information, and route the M2M message to the new platform service.

In some examples, M2M platform management system 600 may update platform messaging architecture 306 based on the addition of the new platform service to and/or the update to the configuration data of the M2M platform. For example, M2M platform management system 600 may detect the addition of the new platform service and update platform messaging architecture 306 to include a new queue for the new platform service.

These updates to the functionality set of the M2M platform may be performed dynamically during runtime operation of the M2M platform and without interrupting the runtime operations of the M2M platform. In addition, the M2M solution may be provided continuously without interruption during the dynamic updating of M2M platform such that the update is transparent to the customer using the M2M solution.

Figure 19:
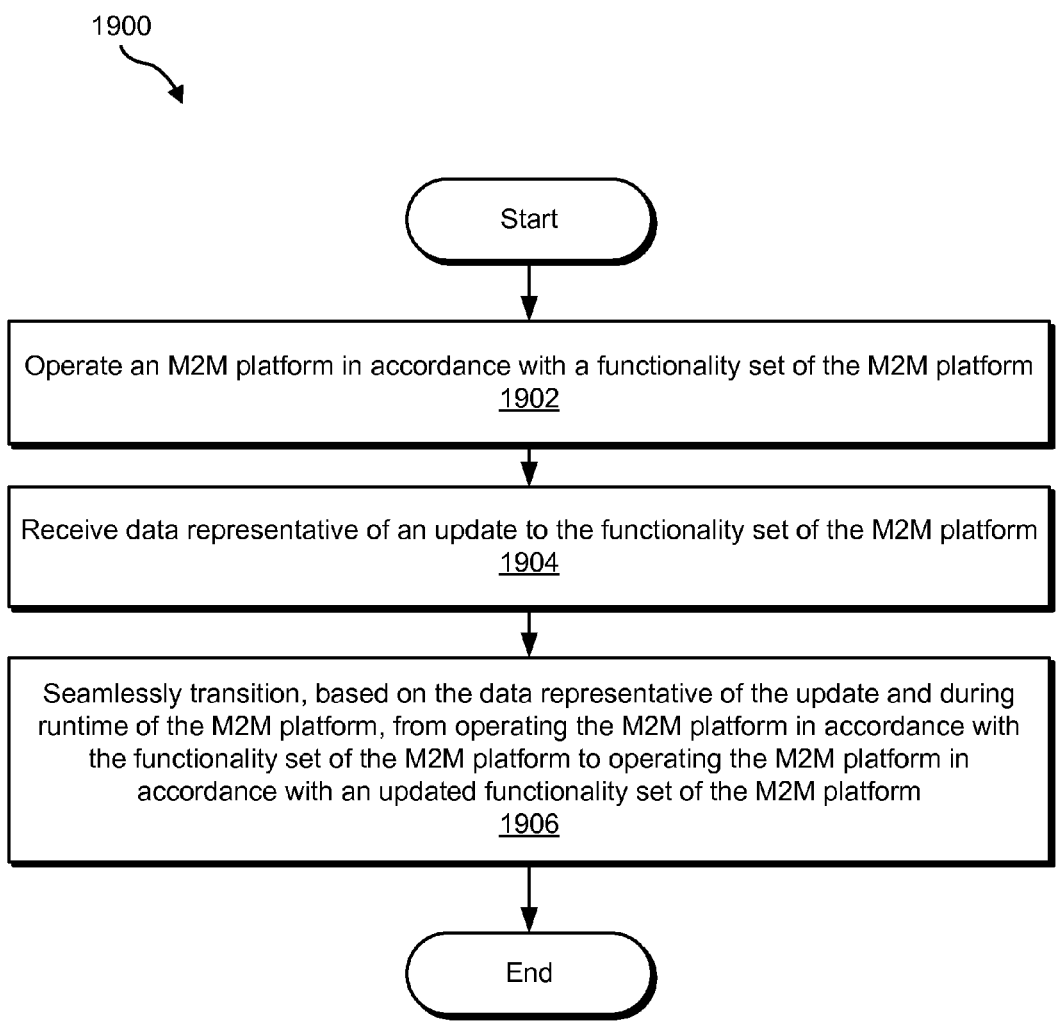
FIGS. 19-20 illustrate exemplary M2M platform methods according to principles disclosed herein.

FIG. 19 illustrates an exemplary M2M platform method 1900. While FIG. 19 illustrates exemplary steps according to one embodiment, other embodiments may omit, add to, reorder, combine, and/or modify any of the steps shown in FIG. 19. In certain examples, one or more of the steps shown in FIG. 19 may be performed by M2M platform system 302 and/or any implementation thereof.

In step 1902, an M2M platform system operates an M2M platform in accordance with a functionality set of the M2M platform, such as described herein.

In step 1904, the M2M platform system receives data representative of an update to the functionality set of the M2M platform, such as described herein.

In step 1906, the M2M platform system seamlessly transitions, based on the data representative of the update and during runtime of the M2M platform, from operating the M2M platform in accordance with the functionality set of the M2M platform to operating the M2M platform in accordance with an updated functionality set of the M2M platform. Step 1906 may be performed in any of the ways described herein and may include dynamically updating data representative of the functionality set of the M2M platform, such as by updating platform service data to update a set of platform services of the M2M platform, updating configuration data for the set of platform services, and/or updating platform messaging architecture data to update a platform messaging architecture of the M2M platform as described herein.

Figure 20:
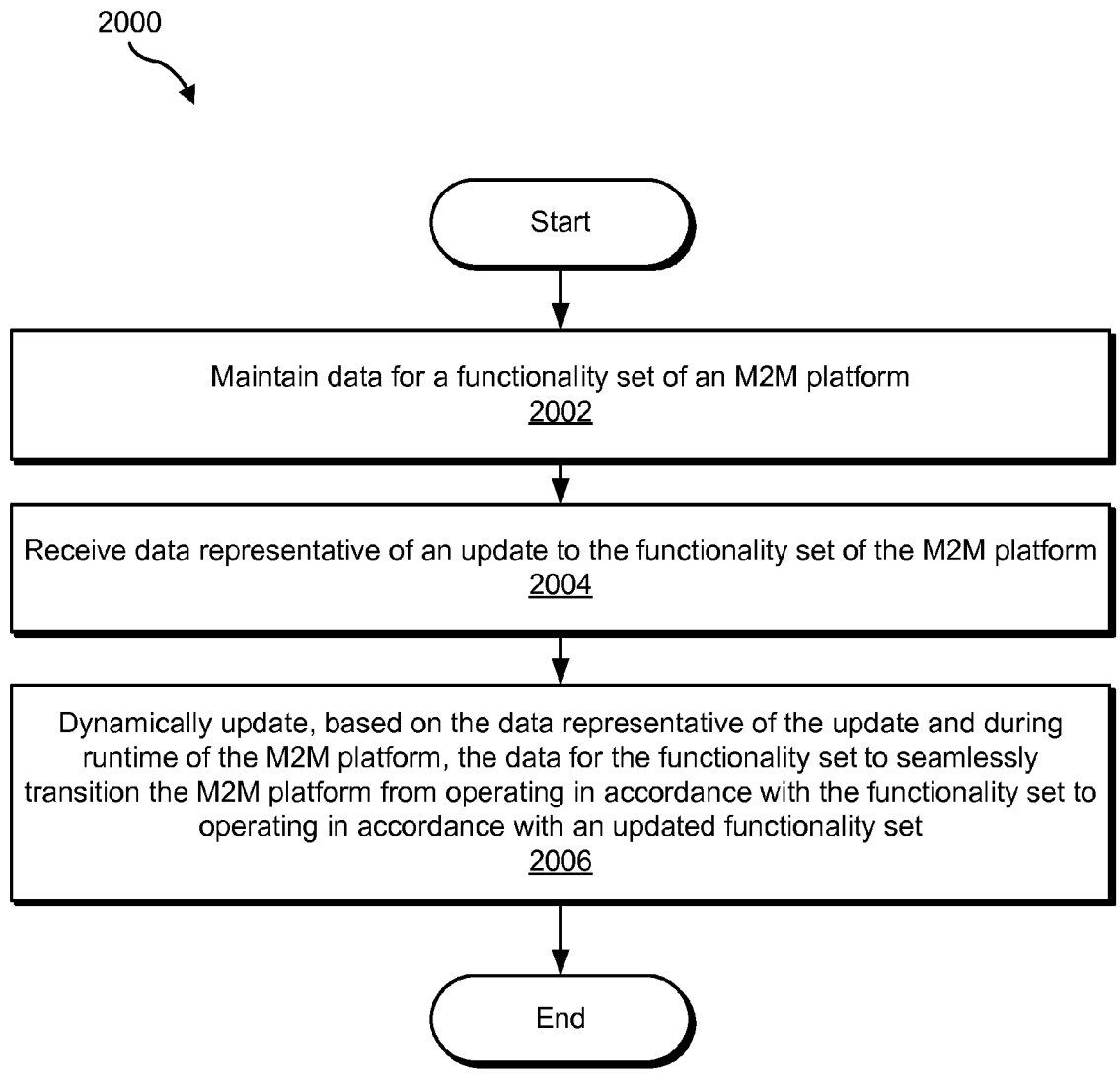

FIG. 20 illustrates another exemplary M2M platform method 2000. While FIG. 20 illustrates exemplary steps according to one embodiment, other embodiments may omit, add to, reorder, combine, and/or modify any of the steps shown in FIG. 20. In certain examples, one or more of the steps shown in FIG. 20 may be performed by M2M platform management system 600 and/or any implementation thereof.

In step 2002, an M2M platform management system maintains data for a functionality set of an M2M platform. Step 2002 may be performed in any of the ways described herein. For example, the M2M platform management system may maintain platform service data 608, platform messaging architecture data 610, and configuration data 612 as described herein.

In step 2004, the M2M platform management system receives data representative of an update to the functionality set of the M2M platform, such as described herein.

In step 2006, the M2M platform management system dynamically updates, based on the data representative of the update and during runtime of the M2M platform, the data for the functionality set to seamlessly transition the M2M platform from operating in accordance with the functionality set to operating in accordance with an updated functionality set. Step 2006 may be performed in any of the ways described herein and may include M2M platform management system dynamically updating data representative of the functionality set of the M2M platform, such as by updating platform service data to update a set of platform services of the M2M platform, updating configuration data for the set of platform services, and/or updating platform messaging architecture data to update a platform messaging architecture of the M2M platform as described herein.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a disk, hard disk, magnetic tape, any other magnetic medium, a CD-ROM, DVD, any other optical medium, a RAM, a PROM, an EPROM, a FLASH-EEPROM, any other memory chip or cartridge, or any other tangible medium from which a computer can read.

Figure 21:
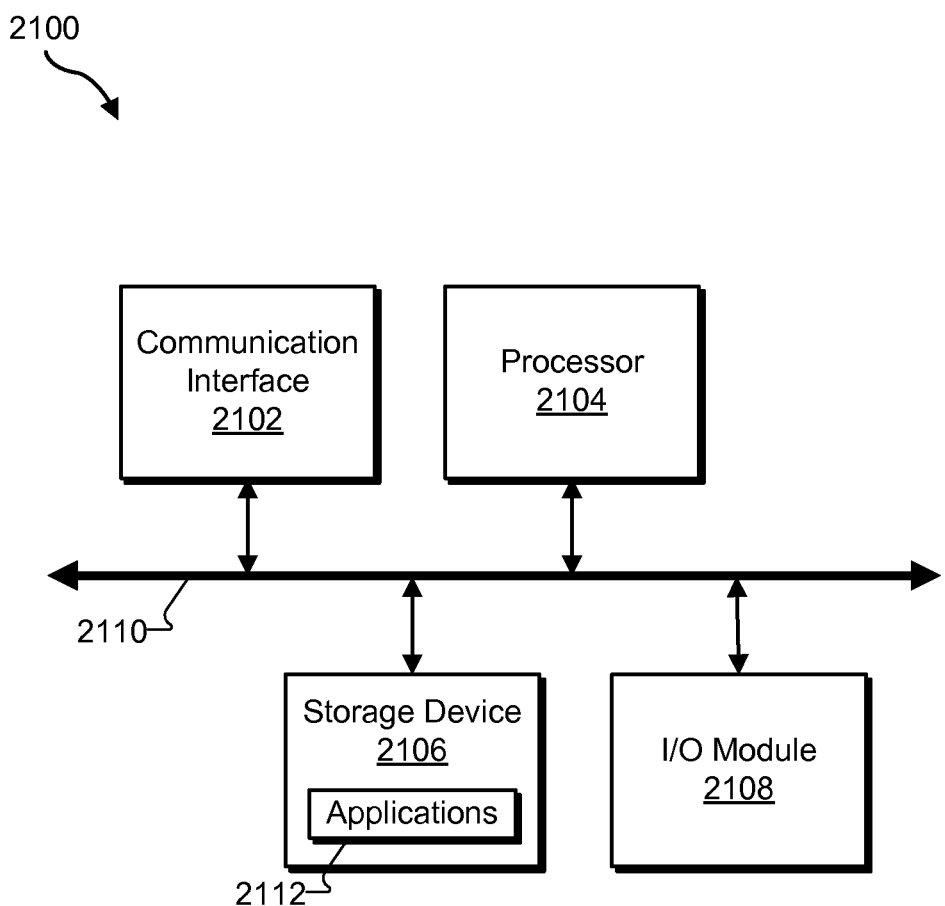
FIG. 21 illustrates an exemplary computing device according to principles described herein.

FIG. 21 illustrates an exemplary computing device 2100 that may be configured to perform one or more of the processes described herein. As shown in FIG. 21, computing device 2100 may include a communication interface 2102, a processor 2104, a storage device 2106, and an input/output ("I/O") module 2108 communicatively connected via a communication infrastructure 2110. While an exemplary computing device 2100 is shown in FIG. 21, the components illustrated in FIG. 21 are not intended to be limiting. Additional or alternative components may be used in other embodiments. Components of computing device 2100 shown in FIG. 21 will now be described in additional detail.

Communication interface 2102 may be configured to communicate with one or more computing devices. Examples of communication interface 2102 include, without limitation, a wired network interface (such as a network interface card), a wireless network interface (such as a wireless network interface card), a modem, an audio/video connection, and any other suitable interface.

Processor 2104 generally represents any type or form of processing unit capable of processing data or interpreting, executing, and/or directing execution of one or more of the instructions, processes, and/or operations described herein. Processor 2104 may execute and/or direct execution of operations as directed by one or more applications 2112 (which may include one or more software applications) or other computer-executable instructions such as may be stored in storage device 2106 or another computer-readable medium.

Storage device 2106 may include one or more data storage media, devices, or configurations and may employ any type, form, and combination of data storage media and/or device. For example, storage device 2106 may include, but is not limited to, a hard drive, network drive, flash drive, magnetic disc, optical disc, random access memory ("RAM"), dynamic RAM ("DRAM"), other non-volatile and/or volatile data storage units, or a combination or sub-combination thereof. Electronic data, including data described herein, may be temporarily and/or permanently stored in storage device 2106. For example, data representative of one or more executable applications 2112 configured to direct processor 2104 to perform any of the operations described herein may be stored within storage device 2106. In some examples, data may be arranged in one or more databases residing within storage device 2106.

I/O module 2108 may be configured to receive user input and provide user output and may include any hardware, firmware, software, or combination thereof supportive of input and output capabilities. For example, I/O module 2108 may include hardware and/or software for capturing user input, including, but not limited to, a keyboard or keypad, a touch screen component (e.g., touch screen display), a receiver (e.g., an RF or infrared receiver), and/or one or more input buttons.

I/O module 2108 may include one or more devices for presenting output to a user, including, but not limited to, a graphics engine, a display (e.g., a display screen, one or more output drivers (e.g., display drivers), one or more audio speakers, and one or more audio drivers. In certain embodiments, I/O module 2108 is configured to provide graphical data to a display for presentation to a user. The graphical data may be representative of one or more graphical user interfaces and/or any other graphical content as may serve a particular implementation.

In some examples, any of the systems and/or system components described herein may be implemented by or within one or more components of computing device 2100. For example, one or more applications 2112 residing within storage device 2106 may be configured to direct processor 2104 to perform one or more processes or functions associated with M2M system 100, platform system 302, and/or M2M platform management system 600, or one or more components of M2M system 100, platform system 302, and/or M2M platform management system 600. Additionally or alternatively, data described herein may be stored by storage device 2106.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
   maintaining, by a machine-to-machine ("M2M") platform management system, configuration data for a set of platform services associated with an M2M platform, the M2M platform configured to operate in accordance with the set of platform services and the configuration data;

receiving, by the M2M platform management system, data representative of an update to the configuration data for the set of platform services; and dynamically updating, by the M2M platform management system based on the data representative of the update to the configuration data and during runtime operation of the M2M platform, the configuration data to seamlessly transition the M2M platform from operating in accordance with the configuration data to operating in accordance with the updated configuration data, wherein the set of platform services are configured to provide functionality of the M2M platform and comprise one or more applications running on one or more server devices operated by a provider of the M2M platform, the one or more server devices communicatively connected to one or more M2M client devices associated with one or more in-field customer assets, the set of platform services comprises a configuration management platform service implementing the M2M platform management system and maintaining the configuration data for use by one or more other platform services included in the set of platform services, the dynamic updating of the configuration data comprises the configuration management platform service applying the updated configuration data only to the configuration data maintained by the configuration management platform service and maintaining the updated configuration data for use by the one or more other platform services included in the set of platform services, and each of the one or more other platform services is configured to use the updated configuration data maintained only by the configuration management platform service in a performance of a platform function that is specific to each of the one or more other platform services.

2. The method of claim 1, further comprising:

maintaining, by the machine-to-machine ("M2M") platform management system, platform service data representative of the set of platform services associated with the M2M platform;

receiving, by the M2M platform management system, data representative of an update to the set of platform services; and dynamically updating, by the M2M platform management system based on the data representative of the update to the set of platform services and during the runtime operation of the M2M platform, the platform service data to seamlessly transition the M2M platform from operating in accordance with the set of platform services to operating in accordance with an updated set of platform services.

3. The method of claim 2, wherein the dynamically updating of the platform service data comprises at least one of adding a new platform service to the set of platform services, modifying a platform service included in the set of platform services, and removing a platform service included in the set of platform services from the set of platform services.

4. The method of claim 1, further comprising:

maintaining, by the machine-to-machine ("M2M") platform management system, platform messaging architecture data representative of a platform messaging architecture associated with the M2M platform;

receiving, by the M2M platform management system, data representative of an update to the platform messaging architecture; and dynamically updating, by the M2M platform management system based on the data representative of the update to the platform messaging architecture and during the runtime operation of the M2M platform, the platform messaging architecture data to seamlessly transition the M2M platform from operating in accordance with the platform messaging architecture to operating in accordance with an updated platform messaging architecture.

5. The method of claim 1, wherein the seamless transition does not interrupt the runtime operation of the M2M platform.

6. The method of claim 1, wherein the dynamic updating of the configuration data comprises modifying routing logic configured to govern how platform messages are routed between one or more platform services included in the set of platform services.

7. The method of claim 1, embodied as computer-executable instructions on at least one non-transitory computer-readable medium.

8. The method of claim 1, wherein the one or more server devices are further communicatively connected to a customer computing device configured to communicate with the one or more M2M client devices by way of the M2M platform.

9. The method of claim 8, wherein the set of platform services includes one or more platform services configured to provide functionality for external communications by the one or more server devices with the customer computing device and the one or more M2M client devices.

10. The method of claim 9, wherein the one or more platform services configured to provide functionality for external communications include:

an M2M client gateway service configured to provide functionality for communications between the one or more server devices and the one or more M2M client devices; and a customer interface service configured to provide functionality for communications between the one or more server devices and the customer computing device.

11. A method comprising:

operating, by a machine-to-machine ("M2M") platform system, an M2M platform in accordance with a set of platform services and configuration data for the set of platform services;

receiving, by the M2M platform system, data representative of an update to the set of platform services and the configuration data for the set of platform services; and seamlessly transitioning, by the M2M platform system based on the data representative of the update and during runtime operation of the M2M platform, from the operating of the M2M platform in accordance with the set of platform services and the configuration data for the set of platform services to operating the M2M platform in accordance with an updated set of platform services and updated configuration data for the updated set of platform services, wherein:

the set of platform services are configured to provide functionality of the M2M platform and comprise one or more applications running on one or more server devices operated by an operator of the M2M platform, the one or more server devices communicatively connected to one or more M2M client devices associated with one or more in-field customer assets, the set of platform services comprises a configuration management platform service maintaining the configuration data for use by the set of platform services, the seamlessly transitioning comprises updating only the configuration data maintained by the configuration management platform service for use by the set of platform services based on the data representative of the update to create the updated configuration data for the updated set of platform services, and each platform service included in the updated set of platform services is configured to use the updated configuration data maintained only by the configuration management platform service in a performance of a platform function that is specific to each platform service included in the updated set of platform services.

12. The method of claim 11, wherein the seamlessly transitioning further comprises:

updating the set of platform services based on the data representative of the update to the set of platform services to create the updated set of platform services.

13. The method of claim 12, wherein the updating of the set of platform services comprises at least one of adding a new platform service to the set of platform services, modifying a platform service included in the set of platform services, and removing a platform service included in the set of platform services from the set of platform services.

14. The method of claim 12, wherein:

the updating of the set of platform services comprises adding a new platform service to the set of platform services; and the updating of the configuration data comprises modifying routing logic configured to govern how one or more platform services within the set of platform services route platform messages to account for the new platform service.

15. The method of claim 14, wherein the modifying of the routing logic comprises adding the new platform service as a routing option in the routing logic.

16. The method of claim 12, wherein:

the updating of the set of platform services comprises adding a new platform service to the set of platform services; and the updating of the configuration data comprises modifying a platform service directory to include an entry for the new platform service.

17. The method of claim 11, wherein the updating of the configuration data comprises modifying routing logic configured to govern how platform messages are routed between one or more platform services included in the set of platform services.

18. The method of claim 11, embodied as computer-executable instructions on at least one non-transitory computer-readable medium.

19. A method comprising:

operating, by a machine-to-machine ("M2M") platform system, an M2M platform in accordance with a functionality set of the M2M platform, the functionality set comprising a set of platform services operating in accordance with configuration data maintained by a configuration management platform service included in the set of platform services for use by the set of platform services;

receiving, by the M2M platform system, data representative of an update to the functionality set of the M2M platform; and seamlessly transitioning, by the M2M platform system based on the data representative of the update and during runtime operation of the M2M platform, from the operating of the M2M platform in accordance with the functionality set of the M2M platform to operating the M2M platform in accordance with an updated functionality set of the M2M platform, wherein the set of platform services comprise one or more applications running on one or more server devices operated by an operator of the M2M platform, the one or more server devices communicatively connected to one or more M2M client devices associated with one or more in-field customer assets, the updated functionality set includes updated configuration data maintained only by the configuration management platform service for use by the set of platform services and based on the data representative of the update to the functionality set of the M2M platform, and each platform service included in the set of platform services is configured to use the updated configuration data maintained only by the configuration management platform service in a performance of a platform function that is specific to each platform service included in the set of platform services.

20. The method of claim 19, embodied as computer-executable instructions on at least one non-transitory computer-readable medium.

21. A system comprising:

at least one computing device including a processor and comprising:

an interface facility that receives data representative of an update to configuration data for a set of platform services associated with an M2M platform, the M2M platform configured to operate in accordance with the set of platform services and the configuration data; and a platform management facility communicatively coupled to the interface facility and that dynamically updates, based on the data representative of the update to the configuration data and during runtime operation of the M2M platform, the configuration data to seamlessly transition the M2M platform from operating in accordance with the configuration data to operating in accordance with the updated configuration data, wherein the set of platform services are configured to provide functionality of the M2M platform and comprise one or more applications running on one or more server devices operated by a provider of the M2M platform, the one or more server devices communicatively connected to one or more M2M client devices associated with one or more in-field customer assets, the set of platform services comprises a configuration management platform service implementing the M2M platform management system and maintaining the configuration data for use by one or more other platform services included in the set of platform services, and the platform management facility dynamically updates the configuration data by applying the updated configuration data only to the configuration data maintained by the configuration management platform service and provides the updated configuration data for use by the one or more other platform services included in the set of platform services, and each of the one or more other platform services is configured to use the updated configuration data maintained only by the configuration management platform service in a performance of a platform function that is specific to each of the one or more other platform services.

22. The system of claim 21, wherein:

the interface facility further receives data representative of an update to the set of platform services; and the platform management facility dynamically updates, based on the data representative of the update to the set of platform services and during the runtime operation of the M2M platform, the platform service data to seamlessly transition the M2M platform from operating in accordance with the set of platform services to operating in accordance with an updated set of platform services.

* * * * *